(12) United States Patent
Tiller et al.

(10) Patent No.: US 8,821,756 B2
(45) Date of Patent: Sep. 2, 2014

(54) SUBSTRATE WITH A MODIFIED LIQUID CRYSTAL POLYMER MARKING

(75) Inventors: Thomas Tiller, Bussigny (CH); Olivier Rozumek, Le Păquier-Montbarry (CH); Tristan Jauzein, Lausanne (CH); Andrea Callegari, Chavannes-près-Renens (CH); Frédéric Gremaud, Epagny (CH); Brahim Kerkar, Pully (CH)

(73) Assignee: Sicpa Holding SA, Prilly (CH)

( * ) Notice: Subject to any disclaimer, the term of this patent is extended or adjusted under 35 U.S.C. 154(b) by 188 days.

(21) Appl. No.: 13/479,913

(22) Filed: May 24, 2012

(65) Prior Publication Data

US 2012/0328852 A1 Dec. 27, 2012

Related U.S. Application Data

(60) Provisional application No. 61/490,949, filed on May 27, 2011, provisional application No. 61/492,171, filed on Jun. 1, 2011.

(30) Foreign Application Priority Data

Jun. 1, 2011 (EP) .................................... 11168536

(51) Int. Cl.
| | | |
|---|---|---|
| *C09K 19/58* | (2006.01) | |
| *C09K 19/54* | (2006.01) | |
| *B42D 15/00* | (2006.01) | |
| *B41M 3/14* | (2006.01) | |
| *B41M 5/28* | (2006.01) | |
| *C09K 19/34* | (2006.01) | |
| *C09K 19/04* | (2006.01) | |

(52) U.S. Cl.
CPC .... *B42D 15/0013* (2013.01); *C09K 2019/3408* (2013.01); *B41M 5/281* (2013.01); *C09K 19/588* (2013.01); *B42D 2035/20* (2013.01); *B42D 2033/26* (2013.01); *B41M 3/14* (2013.01); *C09K 19/586* (2013.01); *C09K 2219/03* (2013.01); *C09K 2019/0448* (2013.01)

USPC ................ 252/299.5; 252/299.01; 428/195.1; 428/199; 283/72; 283/74; 235/454; 235/462.01; 347/110; 427/7

(58) Field of Classification Search
CPC .... B41M 3/14; B41M 5/281; B42D 15/0013; B42D 2033/26; B42D 2035/26; C09K 19/54; C09K 19/588; C09K 2019/0448; C09K 2219/03
USPC ............... 252/299.01, 299.5; 428/195.1, 199; 283/72, 74; 347/110; 427/7
See application file for complete search history.

(56) References Cited

U.S. PATENT DOCUMENTS

| 5,678,863 A | 10/1997 | Knight et al. |
| 5,723,066 A | 3/1998 | Coates et al. |

(Continued)

FOREIGN PATENT DOCUMENTS

| EP | 0 216 712 | 4/1987 |
| EP | 0 847 432 | 6/1998 |

(Continued)

OTHER PUBLICATIONS

U.S. Appl. No. 61/420,580 to Jauzen et al., filed Dec. 7, 2010.

(Continued)

*Primary Examiner* — Shean C Wu
(74) *Attorney, Agent, or Firm* — Greenblum & Bernstein, P.L.C.

(57) ABSTRACT

The present invention relates to a marking on an item or substrate, which marking is based on a chiral nematic (also called cholesteric) liquid crystal precursor composition. Prior to curing the chiral liquid crystal precursor composition in the chiral liquid crystal state at least one optical property exhibited by the composition is modified by two modifying agents of different types in at least one area of the item or substrate.

33 Claims, 3 Drawing Sheets

(56) References Cited

U.S. PATENT DOCUMENTS

| | | | |
|---|---|---|---|
| 6,136,225 A | 10/2000 | Meyer et al. | |
| 6,207,240 B1 | 3/2001 | Schoenfeld et al. | |
| 6,589,445 B2 | 7/2003 | Sugiyama et al. | |
| 7,033,653 B2 | 4/2006 | Kuntz et al. | |
| 7,742,136 B2 | 6/2010 | Umemoto et al. | |
| 8,426,011 B2 * | 4/2013 | Tiller et al. | 428/195.1 |
| 8,426,012 B2 * | 4/2013 | Tiller et al. | 428/195.1 |
| 8,426,013 B2 * | 4/2013 | Tiller et al. | 428/195.1 |
| 8,426,014 B2 * | 4/2013 | Tiller et al. | 428/195.1 |
| 2006/0257633 A1 | 11/2006 | Inoue et al. | |
| 2007/0224341 A1 | 9/2007 | Kuntz et al. | |
| 2008/0252066 A1 | 10/2008 | Rapoport et al. | |
| 2010/0025641 A1 | 2/2010 | Jimbo et al. | |
| 2011/0133445 A1 | 6/2011 | Tiller et al. | |
| 2011/0135853 A1 | 6/2011 | Tiller et al. | |
| 2011/0135889 A1 | 6/2011 | Tiller et al. | |
| 2011/0135890 A1 | 6/2011 | Tiller et al. | |

FOREIGN PATENT DOCUMENTS

| | | |
|---|---|---|
| EP | 1 681 586 | 7/2006 |
| GB | 2 330 139 | 4/1999 |
| JP | 2009-300662 | 12/2009 |
| WO | 93/22397 | 11/1993 |
| WO | 95/22586 | 8/1995 |
| WO | 97/00600 | 1/1997 |
| WO | 01/24106 | 4/2001 |
| WO | 02/085642 | 10/2002 |
| WO | 2008/127950 | 10/2008 |

OTHER PUBLICATIONS

U.S. Appl. No. 61/420,582 to Callegari et al., filed Dec. 7, 2010.

* cited by examiner

SUBSTRATE WITH A MODIFIED LIQUID CRYSTAL POLYMER MARKING

CROSS-REFERENCE TO RELATED APPLICATIONS

The present application claims the benefit under 35 U.S.C. §119(e) of U.S. Provisional Application Nos. 61/490,949, filed May 27, 2011 and 61/492,171, filed Jun. 1, 2011, and claims priority under 35 U.S.C. §119 of EP 11168536.8, filed Jun. 1, 2011. The entire disclosures of these applications are expressly incorporated by reference herein.

BACKGROUND OF THE INVENTION

1. Field of the Invention

The present invention relates to a marking on an item or substrate, which marking is based on a chiral nematic (also called cholesteric) liquid crystal precursor composition. Prior to curing the chiral liquid crystal precursor composition in the chiral liquid crystal state at least one optical property exhibited by the composition is modified by two modifying agents of different types in at least one area of the item or substrate.

2. Discussion of Background Information

Counterfeit is no longer a national or a regional problem but a worldwide problem which has an impact not only on manufacturers but also on the consumer. Counterfeiting is a significant problem with goods like clothes and watches but becomes even more serious when it affects medicines and drugs. Each year thousands of people around the world die because of counterfeit drugs. Counterfeiting has also an impact on government revenues in that it affects the collection of taxes for, e.g., cigarettes and alcohol because of the existence of a black market where it is impossible to track and trace counterfeit (smuggled, diverted, etc.) products with no valid tax stamps.

Many solutions have been proposed to make counterfeiting impossible or at least very difficult and/or costly, for example RFID solutions and the use of invisible inks.

More recently, a security feature has emerged and is used to authenticate a genuine product such as a drug and to avoid counterfeiting. This technology is based on optically variable inks. Its principle is based on the difference in observable color of a marking made with optically variable inks when a packaging, security document, etc. carrying the marking is viewed from different angles ("viewing-angle dependent color").

Optically variable inks provide first-line recognizability not only by a person, but also facilitate machine-readability. Many patents describe this kind of security products, their composition and their application. One example of the many types of optically variable inks is the class of compounds called cholesteric liquid crystals. When illuminated with white light, the cholesteric liquid crystal structure reflects light of a certain color which depends on the material in question and generally varies with the viewing angle and the temperature. The cholesteric material itself is colorless and the observed color is the result of a physical reflection effect at the cholesteric helical structure that is adopted by the chiral liquid crystal precursor composition at a given temperature. See, e.g., J. L. Fergason, Molecular Crystals, Vol. 1, pp. 293-307 (1966), the entire disclosure of which is incorporated by reference herein.

EP-A-1 381 520 and EP-A-1 681 586, the entire disclosures of which are incorporated by reference herein, disclose a birefringent marking and a method of applying the same in the form of a liquid crystal layer having a non-uniform pattern of regions of different thickness. The applied liquid crystal coating or layer may provide for a hidden image on a reflecting substrate, which image is invisible when viewed under non-polarized light but is rendered visible under polarized light or with the help of a polarization filter.

U.S. Pat. No. 5,678,863, the entire disclosure of which is incorporated by reference herein, discloses means for the identification of documents of value which include a paper or polymer region, said region having a transparent and translucent characteristic. A liquid crystal material is applied to the region to produce an optical effect, which differs when viewed in transmitted and reflected light. The liquid crystal material is in liquid form at room temperature and must be enclosed in a containing means such as microcapsules in order to be suitable for use in a printing process such as gravure, roller, spray or ink jet printing.

The ordered liquid crystalline state depends upon the presence of a chiral dopant. Nematic liquid crystals without chiral dopant show a molecular arrangement that is characterized by its birefringence. Nematic polymers are known from, e.g., EP-A-0 216 712, EP-A-0 847 432, and U.S. Pat. No. 6,589,445, the entire disclosures of which are incorporated by reference herein.

As mentioned above, the liquid crystal based security feature provides first-line recognizability by the consumer and also by retailers and producers of goods and articles. Like for many other security features which are used in the market, there is always the temptation for counterfeiters to reproduce these security features and thereby mislead consumers and retailers. In view of the foregoing facts, there continues to be a need to improve the security of liquid crystal polymer materials based on liquid crystal precursors.

One possibility of enhancing the security level of a chiral liquid crystal polymer film would appear to be superposing a code in the form of a pattern, indicia, a bar code, etc. on the liquid crystal polymer film. However, there is always a risk that a counterfeiter tampers with the code and manually applies it onto the liquid crystal polymer film.

A second possibility of overcoming this problem is to insert the code inside the liquid crystal polymer film. For example, U.S. Pat. No. 6,207,240, the entire disclosure of which is incorporated by reference herein, describes an effect coating of a cholesteric liquid crystal polymer (CLCP) with viewing angle dependent reflection color that further comprises absorption type pigments exhibiting a specific absorption color. A marking, such as a symbol or a text, is generated in the CLCP coating by laser irradiation. The laser radiation carbonizes the CLCP material in the irradiated area. As a result, the color of the substrate on which the CLCP is coated, or the color of absorption pigments incorporated into the CLCP, becomes visible in the irradiated area. However, the method requires high-power lasers to carbonize the material and to make the markings visible.

Another possibility is described in US 2006/0257633 A1, the entire disclosure of which is incorporated by reference herein, which is applied not only to liquid crystal polymers but to polymers in general. The method consists of applying a permeating substance to a predetermined region on the surface of the polymer substrate and bringing a supercritical fluid into contact with the surface of the polymer substrate to which the permeating substance has been applied to cause the permeating substance to permeate into the polymer substrate. The method makes it possible to selectively (partially) modify a portion of the surface of the polymer. However, for industrial processes where a high marking speed for a large number of items is required the method is complex and expensive to implement.

One of the drawbacks of the methods cited above is the lack of ability to modify the chiral liquid crystal polymer layer in a selective and controlled manner and to create a strong and reliable marking or coding that is difficult, if not impossible, to reproduce and also is compatible with a production line (processes for making items such as passports, packaging, etc.).

SUMMARY OF THE INVENTION

The present invention provides a marking on an item or on a substrate. The marking comprises a (continuous or discontinuous) layer or a pattern of a chiral liquid crystal polymer composition that exhibits an initial set of optical properties and is made by curing a chiral liquid crystal precursor composition in a chiral liquid crystal state. The layer or pattern comprises (1) one or more first areas exhibiting a first modified set of optical properties that is different from the initial set of optical properties and is obtainable by contacting the chiral liquid crystal precursor composition in the one or more first areas with a first modifying agent;

(2) one or more second areas exhibiting a second set of modified optical properties that is different from the initial set of optical properties and different from the first modified set of optical properties and is obtainable by contacting the chiral liquid crystal precursor composition in the one or more second areas with a second modifying agent that is of a different type than the first modifying agent.

In one aspect of the marking, at least one of the one or more first areas may be partially or completely overlapped by at least one second area and/or at least one of the one or more second areas may be partially or completely overlapped by at least one first area.

In another aspect of the marking, at least one of the one or more first areas may not be overlapped by any second area and/or at least one of the one or more second areas may not be overlapped by any first area.

In yet another aspect of the marking of the present invention, the initial and the first and second modified sets of optical properties may differ with respect to at least one property of light that is reflected by the chiral liquid crystal polymer composition. For example, the at least one property may be selected from one or more of the spectrum, the polarization, and $\lambda_{max}$ of the reflected light.

In a still further aspect of the marking, the initial and the first and second modified sets of optical properties may comprise at least one property that is indicative of an optically anisotropic state of the chiral liquid crystal polymer composition.

In another aspect, the chiral liquid crystal precursor composition may comprise (i) one or more nematic compounds A, (ii) one or more chiral dopant compounds B that are capable of giving rise to a cholesteric state of the chiral liquid crystal precursor composition, and (iii) at least one salt that changes a maximum wavelength of the selective reflection band ($\lambda_{max}$) exhibited by the polymer composition compared to a maximum wavelength of the selective reflection band ($\lambda_{max}$) exhibited by a polymer composition that does not contain the at least one salt.

In one aspect, the one or more nematic compounds A as well as the one or more chiral dopant compounds B may comprise at least one compound that comprises at least one polymerizable group. The at least one polymerizable group may comprise, for example, an unsaturated carbon-carbon bond such as a group of formula $H_2C=CH-C(O)-$.

In another aspect, the one or more nematic compounds A and all of the one or more chiral dopant compounds B may comprise at least one polymerizable group.

In yet another aspect, the chiral liquid crystal precursor composition may comprise at least one chiral dopant compound B of formula (I):

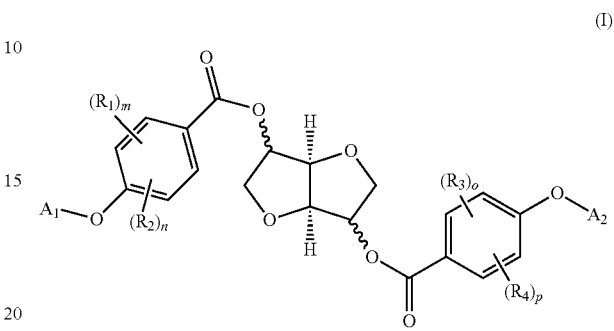

wherein:

$R_1$, $R_2$, $R_3$, $R_4$, $R_5$, $R_6$, $R_7$ and $R_8$ each independently denote $C_1$-$C_6$ alkyl and $C_1$-$C_6$ alkoxy;

$A_1$ and $A_2$ each independently denote a group of formula (i) to (iii):

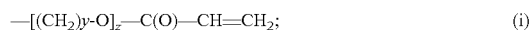
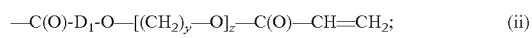
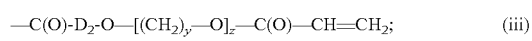

$D_1$ denotes a group of formula

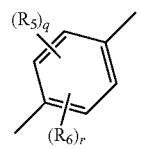

$D_2$ denotes a group of formula

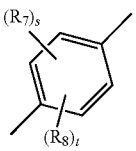

m, n, o, p, q, r, s, and t each independently denote 0, 1, or 2;
y denotes 0, 1, 2, 3, 4, 5, or 6;
z equals 0 if y equals 0 and z equals 1 if y equals 1 to 6.

In another aspect, the at least one salt may be selected from metal salts and ammonium salts. For example, the at least one salt may comprise at least one of lithium perchlorate, lithium nitrate, lithium tetrafluoroborate, lithium bromide, lithium chloride, tetrabutylammonium perchlorate, tetrabutylammonium chloride, tetrabutylammonium tetrafluoroborate, tetrabutylammonium bromide, sodium carbonate, sodium chloride, and sodium nitrate. In another aspect, the at least one salt may comprise lithium perchlorate.

In another aspect of the marking of the present invention, the chiral liquid crystal precursor composition may be in an initial optically anisotropic state and in the one or more first areas the initial optically anisotropic state may be changed to a first modified optically anisotropic state, and in the one or more second areas the initial optically anisotropic state may be changed to a second modified optically anisotropic state or converted to an optically isotropic state.

In another aspect, the chiral liquid crystal precursor composition may be in an initial chiral liquid crystal state and in the one or more first areas the initial chiral liquid crystal state may be changed to a first modified chiral liquid crystal state by the first modifying agent, and in the one or more second areas the initial chiral liquid crystal state may be changed to a second modified chiral liquid crystal state or may be changed to a non-chiral liquid crystal state by the second modifying agent.

In yet another aspect of the marking of the present invention, the first modifying agent may be solid and/or semi-solid and the second modifying agent may be fluid and/or the first modifying agent may be virtually unable to penetrate the chiral liquid crystal precursor composition and the second modifying agent may at least partially penetrate the precursor composition. A semi-solid is able to support its own weight and hold its shape, while having the ability to flow under pressure for instance.

In another aspect, the first modifying agent may be or may comprise a resin that is made from one or more polymerizable monomers. Further, at least one of the one or more polymerizable monomers may comprise at least two unsaturated carbon-carbon bonds and/or may comprise at least one heteroatom selected from O, N and S. Merely by way of example, at least one of the one or more polymerizable monomers may comprise at least one group of formula $H_2C=CH-C(O)-$ or $H_2C=C(CH_3)-C(O)-$. In another aspect, the resin may comprise a radiation-cured resin such as a UV-cured resin and/or the resin may comprise a dried aqueous resin.

In another aspect, the second modifying agent may be fluid and selected from one or more of (a) a modifying composition that comprises at least one compound selected from ketones having from 3 to about 6 carbon atoms, alkyl esters and dialkylamides of carboxylic acids which comprise a total of from 2 to about 6 carbon atoms, dialkyl sulfoxides comprising a total of from 2 to about 4 carbon atoms, and optionally substituted nitrobenzene, (b) a modifying composition that comprises at least one chiral liquid crystal precursor composition, and (c) a modifying composition that comprises at least one chiral dopant composition.

In yet another aspect of the marking of the present invention, the first modifying agent may be selected from a solid or semi-solid cured and/or dried resin made from one or more polymerizable monomers, and both the first modifying agent and the second modifying agent may change an initial maximum wavelength of the selective reflection band ($\lambda_{max}$) exhibited by the chiral liquid crystal precursor composition in the chiral liquid crystal state.

In a still further aspect, the first modifying agent and the second modifying agent may act from opposite sides of the layer or pattern of the chiral liquid crystal precursor composition. For example, the first modifying agent may be arranged between the substrate and the layer or pattern in the one or more first areas and the second modifying agent may act from the side opposite the substrate in the one or more second areas.

In another aspect of the marking, the one or more first areas and/or the one or more second areas may be in the form of at least one of an image, a picture, a logo, indicia, and a pattern representing a code selected from one or more of a 1-dimensional barcode, a stacked 1-dimensional barcode, a 2-dimensional barcode, a 3-dimensional barcode, a cloud of dots, a network of lines and a data matrix and/or at least a part of the layer or pattern may be in the form of at least one of an image, a picture, a logo, indicia, and a pattern representing a code selected from one or more of a 1-dimensional barcode, a stacked 1-dimensional barcode, a 2-dimensional barcode, a 3-dimensional barcode, a data matrix.

In another aspect, the item or substrate may be or may comprise at least one of a label, packaging, a cartridge, a container or a capsule that contains foodstuffs, nutraceuticals, pharmaceuticals, or beverages, a banknote, a credit card, a stamp, a tax label, anti-tamper seal, a security document, a passport, an identity card, a driver's license, an access card, a transportation ticket, an event ticket, a voucher, an ink-transfer film, a reflective film, an aluminum foil, and a commercial good.

The present invention also provides a method of providing a marking on an item or substrate as well as an item or substrate produced by this method. The method comprises:
  a) applying onto a surface of an item or substrate, which carries a first modifying agent in one or more first areas, a curable chiral liquid crystal precursor composition which assumes an initial chiral liquid crystal state upon heating it in such a way that the composition covers at least a part of the one or more first areas, the first modifying agent being able to modify the initial chiral liquid crystal state of the composition;
  b) heating the applied composition to bring the same to a first modified chiral liquid crystal state in the one or more first areas and to the initial chiral liquid crystal state in all other areas, if any, of the applied composition;
  c) applying to one or more second areas of the applied composition at least one second modifying agent which is of a different type than the first modifying agent and (1) is able to locally modify the initial and/or first modified chiral liquid crystal states provided by b), or (2) is able to locally modify the initial and/or first modified chiral liquid crystal states provided by b) upon heating the composition;
  d) in the case of (2), heating the composition at least in the one or more second areas; and
  e) curing/polymerizing the entire thus modified chiral liquid crystal precursor composition to produce a liquid crystal polymer marking on the item or substrate.

In one aspect of the method, at least one of the one or more first areas may be partially or completely overlapped by at least one second area and/or at least one of the one or more second areas may be partially or completely overlapped by at least one first area.

In another aspect of the method, at least one of the one or more first areas may not be overlapped by any second area and/or at least one of the one or more second areas may not be overlapped by any first area.

In yet another aspect of the marking of the present invention, the initial and first and second modified sets of optical properties may differ with respect to at least one property of light that is reflected by the chiral liquid crystal polymer composition. For example, the at least one property may be selected from one or more of the spectrum, the polarization, and $\lambda_{max}$ of the reflected light.

In a still further aspect of the method, the initial and first and second modified sets of optical properties may comprise at least one property that is indicative of an optically anisotropic state of the chiral liquid crystal polymer composition and/or is indicative of a conversion of an optically anisotropic state to an optically isotropic state of the composition.

In another aspect, the chiral liquid crystal precursor composition may comprise (i) one or more nematic compounds A, (ii) one or more chiral dopant compounds B that are capable of giving rise to a cholesteric state of the chiral liquid crystal precursor composition, and (iii) at least one salt that changes a maximum wavelength of the selective reflection band ($\lambda_{max}$) exhibited by the polymer composition compared to a maximum wavelength of the selective reflection band ($\lambda_{max}$) exhibited by a polymer composition that does not contain the at least one salt.

In one aspect, the one or more nematic compounds A as well as the one or more chiral dopant compounds B may comprise at least one compound that comprises at least one polymerizable group. The at least one polymerizable group may comprise, for example, an unsaturated carbon-carbon bond such as a group of formula $H_2C=CH-C(O)-$.

In another aspect, the one or more nematic compounds A and all of the one or more chiral dopant compounds B may comprise at least one polymerizable group.

In yet another aspect, the chiral liquid crystal precursor composition may comprise at least one chiral dopant compound B of formula (I):

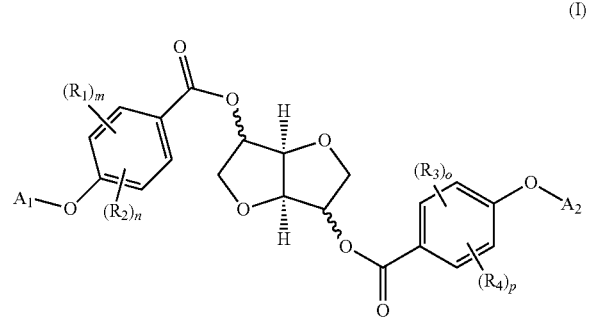

wherein:
$R_1$, $R_2$, $R_3$, $R_4$, $R_5$, $R_6$, $R_7$ and $R_8$ each independently denote $C_1$-$C_6$ alkyl and $C_1$-$C_6$ alkoxy;
$A_1$ and $A_2$ each independently denote a group of formula (i) to (iii):

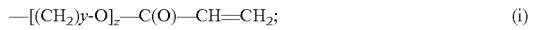

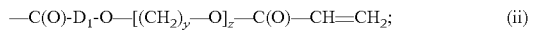

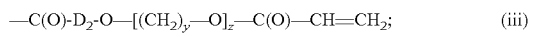

$D_1$ denotes a group of formula

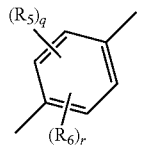

$D_2$ denotes a group of formula

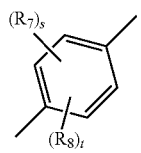

m, n, o, p, q, r, s, and t each independently denote 0, 1, or 2;
y denotes 0, 1, 2, 3, 4, 5, or 6;
z equals 0 if y equals 0 and z equals 1 if y equals 1 to 6.

In another aspect, the at least one salt may be selected from metal salts and ammonium salts. For example, the at least one salt may comprise at least one of lithium perchlorate, lithium nitrate, lithium tetrafluoroborate, lithium bromide, lithium chloride, tetrabutylammonium perchlorate, tetrabutylammonium chloride, tetrabutylammonium tetrafluoroborate, tetrabutylammonium bromide, sodium carbonate, sodium chloride, and sodium nitrate. In another aspect, the at least one salt may comprise lithium perchlorate and/or lithium bromide.

In another aspect of the method of the present invention, the chiral liquid crystal precursor composition may be in an initial optically anisotropic state and in the one or more first areas the initial optically anisotropic state may get changed to a first modified optically anisotropic state, and in the one or more second areas the initial optically anisotropic state may get changed to a second modified optically anisotropic state or converted to an optically isotropic state (depending on the nature of the second modifying agent, as set forth below).

In yet another aspect of the method of the present invention, the first modifying agent may be solid or semi-solid and the second modifying agent may be fluid and/or the first modifying agent may be virtually unable to penetrate the chiral liquid crystal precursor composition and the second modifying agent at least partially penetrates the chiral liquid crystal precursor composition.

In another aspect, the first modifying agent may be or may comprise a resin that is made from one or more polymerizable monomers. Further, at least one of the one or more polymerizable monomers may comprise at least two unsaturated carbon-carbon bonds and/or may comprise at least one heteroatom selected from O, N and S. Merely by way of example, at least one of the one or more polymerizable monomers may comprise at least one group of formula $H_2C=CH-C(O)-$ or $H_2C=C(CH_3)-C(O)-$. In another aspect, the resin may comprise a radiation-cured resin such as a UV-cured resin and/or the resin may comprise a dried aqueous resin.

In another aspect, the second modifying agent may be fluid and selected from one or more of (a) a modifying composition that comprises at least one compound selected from ketones having from 3 to about 6 carbon atoms, alkyl esters and dialkylamides of carboxylic acids which comprise a total of from 2 to about 6 carbon atoms, dialkyl sulfoxides comprising a total of from 2 to about 4 carbon atoms, and optionally substituted nitrobenzene, (b) a modifying composition that comprises at least one chiral liquid crystal precursor composition, and (c) a modifying composition that comprises at least one chiral dopant composition.

In yet another aspect of the method of the present invention, the first modifying agent may be selected from a solid or semi-solid cured and/or dried resin made from one or more polymerizable monomers, and both the first modifying agent and the second modifying agent may change an initial maximum wavelength of the selective reflection band ($\lambda_{max}$) exhibited by the chiral liquid crystal precursor composition in the chiral liquid crystal state.

In a still further aspect of the method, step b) and/or step d) may comprise a heating of the chiral liquid crystal precursor composition to a temperature of from about 55° C. to about 150° C.

In another aspect, the chiral liquid crystal precursor composition may be applied by at least one of spray coating, knife coating, roller coating, screen coating, curtain coating, gravure printing, flexography, screen-printing, pad printing, continuous ink-jet printing, drop-on-demand ink jet printing, and valve-jet printing and/or the chiral liquid crystal precursor composition may be applied in the form of at least one of a (continuous or discontinuous) layer, an image, a picture, a logo, indicia, and a pattern representing a code selected from one or more of a 1-dimensional barcode, a stacked 1-dimensional barcode, a 2-dimensional barcode, a 3-dimensional barcode, a cloud of dots, a network of lines and a data matrix.

In another aspect of the method of the present invention, the first modifying agent may have been provided on the item or substrate in the one or more first areas by at least one of spray coating, knife coating, roller coating, screen coating, curtain coating, gravure printing, flexography, offset printing, dry offset printing, letterpress printing, screen-printing, pad printing, continuous ink-jet printing, drop-on-demand ink-jet printing, and valve jet printing and/or the first modifying agent may be present on the item or substrate in the one or more first areas in the form of at least one of an image, a picture, a logo, indicia, and a pattern representing a code selected from one or more of a 1-dimensional barcode, a stacked 1-dimensional barcode, a 2-dimensional barcode, a 3-dimensional barcode, a cloud of dots, a network of lines and a data matrix.

In yet another aspect, the second modifying agent may be applied in the one or more second areas by at least one of continuous ink-jet printing, drop-on-demand ink jet printing, spray coating, and valve jet printing and/or the second modifying agent may be applied in the one or more second areas in the form of at least one of an image, a picture, a logo, indicia, and a pattern representing a code selected from one or more of a 1-dimensional barcode, a stacked 1-dimensional barcode, a 2-dimensional barcode, a 3-dimensional barcode, a cloud of dots, a network of lines and a data matrix.

In a still further aspect, the item or substrate may be or may comprise at least one of a label, packaging, a cartridge, a container or a capsule that contains foodstuffs, beverages, nutraceuticals or pharmaceuticals, a banknote, a credit card, a stamp, a tax label, anti-tamper seal, a security document, a passport, an identity card, a driver's license, an access card, a transportation ticket, an event ticket, a voucher, an ink-transfer film, a reflective film, an aluminum foil, and a commercial good.

BRIEF DESCRIPTION OF THE DRAWINGS

The present invention is further described in the detailed description which follows, in reference to the plurality of drawings by way of non-limiting examples of exemplary embodiments of the present invention, and wherein.

DETAILED DESCRIPTION OF THE PRESENT INVENTION

Figure 1:
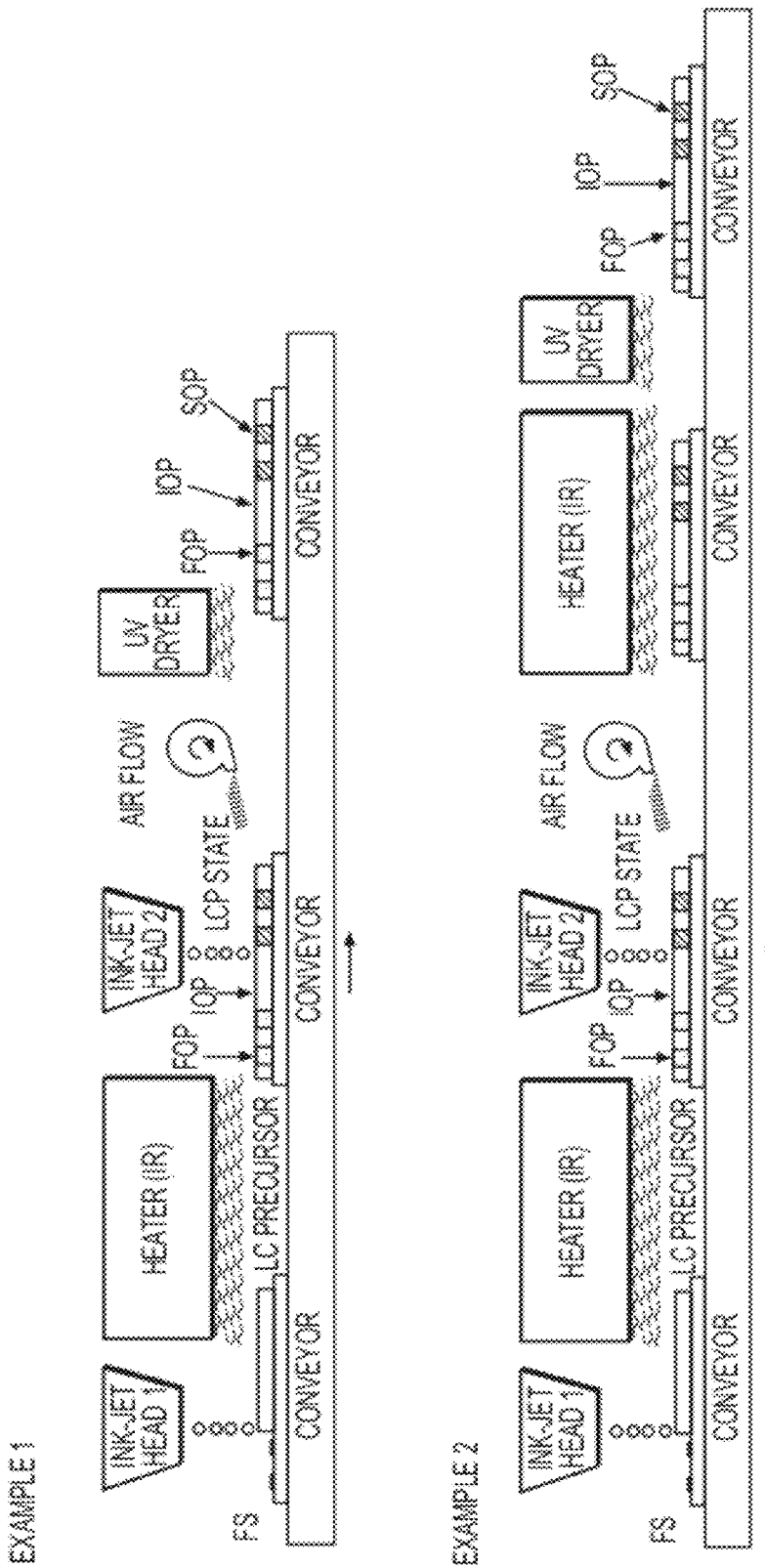
FIG. 1 is scheme illustrating the procedures described in Examples 1 and 2.

The particulars shown herein are by way of example and for purposes of illustrative discussion of the embodiments of the present invention only and are presented in the cause of providing what is believed to be the most useful and readily understood description of the principles and conceptual aspects of the present invention. In this regard, no attempt is made to show structural details of the present invention in more detail than is necessary for the fundamental understanding of the present invention, the description taken with the drawings making apparent to those skilled in the art how the several forms of the present invention may be embodied in practice.

The substrate or item for use in the present invention is not particularly limited and can be of various types. The substrate or item may, for example, consist (essentially) of or comprise one or more of a metal (for example, in the form of a container such as a can a capsule or a closed cartridge for holding various items such as, e.g., nutraceuticals, pharmaceuticals, beverages or foodstuffs), a fabric, a coating, glass (for example, in the form of a container such as a bottle for holding various items such as, e.g., nutraceuticals, pharmaceuticals, beverages or foodstuffs), cardboard (e.g., in the form of packaging), paper, and a polymeric material such as, e.g., PET (polyethylene terephthalate) or polyethylene (e.g., in the form of a container or as a part of a security document). It is pointed out that these substrate materials are given exclusively for exemplifying purposes, without restricting the scope of the invention. In general, any substrate or item (which may not necessarily be flat and may be uneven) whose surface is not soluble, or only slightly soluble, in solvent(s) used in the chiral liquid polymer chiral liquid crystal precursor composition is a suitable substrate for the purposes of the present invention.

The substrate may advantageously have a dark or black surface or background in at least those areas in which the chiral liquid crystal precursor composition is to be applied. Without wishing to be bound by any theory, it is speculated that in the case of a dark or black background the light transmitted by the cholesteric liquid crystal material is largely absorbed by the background, whereby any residual backscattering from the background does not disturb the perception of the cholesteric liquid crystal material's own reflection with the unaided eye. In contrast, on a substrate with a light or white surface or background the reflection color of the cholesteric liquid crystal material is less visible when compared with a black or dark background, due to the strong backscattering from the background. However, even in the case of a light or white background a cholesteric liquid crystal material can be recognized with the help of a circular polarization filter because it selectively reflects only one of the two possible circular polarized light components, in accordance with its chiral helical structure. Further, even with a light or white background is it possible to measure optical properties of the chiral liquid crystal polymer such as, e.g., $\lambda_{max}$, with physical means. The substrate according to the present invention may further comprise additional security elements, such as organic and/or inorganic pigments, dyes, flakes, optically variable elements, magnetic pigments, etc.

The marking of the present invention comprises a (continuous or discontinuous) layer or a pattern of a cured chiral liquid crystal precursor composition in a chiral liquid crystal state (=chiral liquid crystal polymer composition) that exhibits an initial set of optical properties. The layer or pattern comprises, optionally (and preferably) in addition to one or more areas that exhibit the initial set of optical properties (i.e., in which no modifying agent has been applied), (1) one or more first areas (e.g., one, two, three, four, five, six, ten, fifteen, or twenty first areas, in a case of a data matrix this could be 256 areas when making a data matrix 16*16) which exhibit a first modified set of optical properties that is different from the initial set of optical properties and is obtainable by contacting the chiral liquid crystal precursor composition in an uncured state in the one or more first areas with a first modifying agent and (2) one or more second areas (e.g., one, two, three, four, five, six, ten, fifteen, or twenty second areas, in a case of a data matrix this could be 256 areas when making a data matrix 16*16) which exhibit a second modified set of optical properties that is different from the initial set of optical properties and different from the first modified set of optical properties and is obtainable by contacting the chiral liquid crystal precursor composition in an uncured state in the one or more second areas with a second modifying agent that is of a different type than the first modifying agent. In this regard, it is to be appreciated that in order for the first and second modified sets of optical properties to be different it is sufficient for these sets to differ with respect to at least and only one optical property. In other words, the first and second modified sets of optical properties may comprise identical optical properties as long as (at least) one optical property comprised therein is different.

The layer or pattern may comprise more than two different areas (i.e., in addition to the one or more first areas, the one or more second areas and, optionally the one or more areas exhibiting the initial set of optical properties) in which the initial set of optical properties has been modified by more than two different modifying agents as long as there are at least two areas in which two different types of modifying agents have separately or together changed the initial set of optical properties. For example, the layer may comprise three, four, five etc. different areas in which three, four, five, etc. different modifying agents have changed the initial set of optical properties to result in three, four, five, etc. different modified sets of optical properties. In the following the use of only two modifying agents and in particular, two modifying agents of a different type, will frequently be discussed for the sake of simplicity. It is to be appreciated, however, that the present invention is not limited to the use of only two modifying agents of different types and also is not limited to the use of only one modifying agent of a certain type. Merely by way of example, three modifying agents of different types may be used, or one first modifying agent and two different second modifying agents may be employed.

In the marking of the present invention there may further be at least one first area that is not overlapped by any second area and/or there may be at least one second area that is not overlapped by any first area. Further, there may be at least one first area that is completely or partially overlapped by a second area and/or there may be at least one second area that is completely or partially overlapped by a first area. This includes the case where a first area is larger than a second area and completely encompasses/covers the second area and the case where a second area is larger than a first area and completely encompasses/covers the first area (cf. FIG. 2). This also includes the case where a first area and a second area are of the same size and completely coincide. The complete or partial overlap of a first area and a second area would results in a third area, i.e., the area of overlap, giving rise to a third modified set of optical properties (due to the combined action of the first modifying agent and the second modifying agent). Of course, if more than two modifying agents are used the possible number of areas with different sets of optical properties increases exponentially, thereby further increasing the difficulty of counterfeiting the marking of the present invention. Merely by way of example, with three different modifying agents there may be one or more areas in which only the first modifying has been employed, one or more areas in which only the second modifying agent has been employed, one or more areas in which only the third modifying agent has been employed, one or more areas in which both the first modifying agent and the second modifying agent have been employed, one or more areas in which both the first modifying agent and the third modifying agent have been employed, one or more areas in which both the second modifying agent and the third modifying agent have been employed, and one or more areas in which all three modifying agents have been employed. It further is to be appreciated that while the marking of the present invention will usually comprise at least one area which shows the initial set of optical properties (i.e., without modification by any modifying agent), the presence of a corresponding area is not required. For example, the present invention also contemplates a marking in which the entire area occupied by the chiral liquid crystal precursor composition in the chiral liquid crystal state is occupied (and modified) by the first modifying agent and in which one or more (second) areas of the chiral liquid crystal precursor composition (but not the entire area thereof) are additionally modified by the second modifying agent (thereby giving rise to a marking having one or more first areas modified by only the first modifying agent, the remainder being one or more third areas modified by both the first modifying agent and the second modifying agent).

The first and second modifying agents for use in the present invention are of a different type. Merely by way of example, modifying agents are of a different type if they differ in their consistency (e.g., solid and/or semi-solid in one case and fluid (e.g., liquid) in the other case) and/or if they differ in their chemical nature (e.g., monomeric in one case and polymeric in the other case, or essentially organic in one case and essentially inorganic in the other case) and/or if they change/modify an optical property of the composition by a different mechanism and/or if they change/modify different optical properties of the composition and/or if they are able to at least partially penetrate the uncured chiral liquid crystal precursor composition in one case and are substantially unable to penetrate the uncured chiral liquid crystal precursor composition in the other case.

The initial set and the first and second (and optionally third, fourth, etc.) modified sets of optical properties of the marking of the present invention may differ in at least one property of the light that is reflected by the chiral liquid crystal polymer composition in a chiral liquid crystal state. For example, the at least one property may be the spectrum (e.g., in the visible, infrared and/or UV range), the polarization, or $\lambda_{max}$ (e.g., in the visible, infrared and/or UV range) of the reflected light. $\lambda_{max}$ may, for example, be measured using an analytical spectral device that measures the reflectance of a sample in the infrared-near-infrared-visible-UV range of the spectrum, such as the LabSpec Pro device made by Analytical Spectral Devices Inc. of Boulder, Colo.

In another aspect of the marking, the initial set and the first and second (and optionally third, fourth, etc.) modified sets of optical properties may comprise at least one property that is indicative of an optically anisotropic or optically isotropic state of the liquid crystal polymer composition. An example of a corresponding property is the reflection of circular polarized light. In this regard see the explanations provided in, e.g., Y. Jiang et al., "Novel Pigment Approaches in Optically Variable Security Inks Including Polarizing Cholesteric Liquid Crystal (CLC) Polymers", Optical Security and Counterfeit Deterrence Techniques IV, SPIE 4677, 2002, the entire disclosure of which is incorporated by reference herein.

A chiral liquid crystal precursor composition that may be used for making the marking of the present invention and may be applied (e.g., deposited) onto at least a part of at least one surface of the substrate (and, in a preferred embodiment, over at least a part of the first modifying agent provided on the at least one surface of the substrate) preferably comprises a mixture of (i) one or more nematic compounds A and (ii) one or more cholesteric (i.e., chiral dopant) compounds B (including cholesterol) which are capable of giving rise to a cholesteric state of the composition. The pitch of the obtainable cholesteric state depends on the relative ratio of the nematic and the cholesteric compounds and the helical twisting power of the cholesteric compound(s). Typically, the (total) concentration of the one or more nematic compounds A in a chiral liquid crystal precursor composition for use in the present invention will be about four to about fifty times the (total) concentration of the one or more cholesteric compounds B. Often, a chiral liquid crystal precursor composition with a high concentration of cholesteric compounds is not desirable (although possible in many cases) because the one or more cholesteric compounds tend to crystallize, thereby making it impossible to obtain the desired liquid crystal state having specific optical properties.

Nematic compounds A which are suitable for use in the chiral liquid crystal precursor composition are known in the art; when used alone (i.e., without cholesteric compounds) they arrange themselves in a state characterized by its birefringence. Non-limiting examples of nematic compounds A which are suitable for use in the present invention are described in, e.g., WO 93/22397, WO 95/22586, EP-B-0 847 432, U.S. Pat. No. 6,589,445, US 2007/0224341 A1 and JP 2009-300662 A. The entire disclosures of these documents are incorporated by reference herein.

A preferred class of nematic compounds for use in the present invention comprises one or more (e.g., 1, 2 or 3) polymerizable groups, identical or different from each other, per molecule. Examples of polymerizable groups include groups which are capable of taking part in a free radical polymerization and in particular, groups comprising a carbon-carbon double or triple bond such as, e.g., an acrylate moiety, a vinyl moiety or an acetylenic moiety. Particularly preferred as polymerizable groups are acrylate moieties.

The nematic compounds for use in the present invention further may comprise one or more (e.g., 1, 2, 3, 4, 5 or 6) optionally substituted aromatic groups, preferably phenyl groups. Examples of the optional substituents of the aromatic groups include those which are set forth herein as examples of substituent groups on the phenyl rings of the chiral dopant compounds of formula (I) such as, e.g., $(C_1-C_6)$alkyl and/or $(C_1-C_6)$alkoxy groups.

Examples of groups which may optionally be present to link the polymerizable groups and the aryl (e.g., phenyl) groups in the nematic compounds A include those which are exemplified herein for the chiral dopant compounds B of formula (I) (including those of formula (IA) and formula (IB) set forth below). For example, the nematic compounds A may comprise one or more groups of formulae (i) to (iii) which are indicated above as meanings for $A_1$ and $A_2$ in formula (I) (and formulae (IA) and (IB)), typically bonded to optionally substituted phenyl groups. Specific non-limiting examples of nematic compounds which are suitable for use in the present invention include:

2-methoxybenzene-1,4-diyl bis[4-({[4-(acryloyloxy)butoxy]carbonyl}oxy)benzoate];

4-{[4-({[4-(acryloyloxy)butoxy]carbonyl}oxy)benzoyl]oxy}-2-methoxyphenyl 4-({[4-(acryloyl-oxy)butoxy]carbonyl}oxy)-2-methylbenzoate;

2-methoxybenzene-1,4-diyl bis[4-({[4-(acryloyloxy)butoxy]carbonyl}oxy)-2-methyl-benzoate];

2-methylbenzene-1,4-diyl bis[4-({[4-(acryloyloxy)butoxy]carbonyl}oxy)-2-methyl-benzoate];

4-{[4-({[4-(acryloyloxy)butoxy]carbonyl}oxy)benzoyl]oxy}-2-methylphenyl 4-({[4-(acryloyl-oxy)butoxy]carbonyl}oxy)-3-methoxybenzoate;

2-methylbenzene-1,4-diyl bis[4-({[4-(acryloyloxy)butoxy]carbonyl}oxy)benzoate];

2-methylbenzene-1,4-diyl bis[4-({[4-(acryloyloxy)butoxy]carbonyl}oxy)-3-methoxy-benzoate];

4-{[4-({[4-(acryloyloxy)butoxy]carbonyl}oxy)-3-methoxy-benzoyl]oxy}-2-methylphenyl 4-({[4-(acryloyloxy)butoxy]carbonyl}oxy)-3,5-dimethoxybenzoate;

2-methylbenzene-1,4-diyl bis[4-({[4-(acryloyloxy)butoxy]carbonyl}oxy)-3,5-dimethoxy-benzoate]; and 2-methoxybenzene-1,4-diyl bis[4-({[4-(acryloyloxy)butoxy]carbonyl}oxy)-3,5-di-methoxy-benzoate]; as well as 4-{[4-({[4-(acryloyloxy)butoxy]carbonyl}oxy)-3-methoxy-benzoyl]oxy}-2-methoxyphenyl 4-({[4-(acryloyloxy)butoxy]carbonyl}oxy)-3,5-dimethoxybenzoate.

4-({4-[4-(acryloyloxy)butoxy]benzoyl}oxy)-3-methylphenyl 4-[4-(acryloyloxy)butoxy]-2-methylbenzoate;

4-({4-[4-(acryloyloxy)butoxy]benzoyl}oxy)-3-methylphenyl 4-[4-(acryloyloxy)butoxy]-3-methylbenzoate;

2-methylbenzene-1,4-diyl bis{4-[4-(acryloyloxy)butoxy]-2-methylbenzoate};

4-({4-[4-(acryloyloxy)butoxy]-2-methylbenzoyl}oxy)-3-methylphenyl 4-[4-(acryloyloxy)-butoxy]-2,5-dimethylbenzoate;

2-methylbenzene-1,4-diyl bis{4-[4-(acryloyloxy)butoxy]-2,5-dimethylbenzoate};

2-methylbenzene-1,4-diyl bis{4-[4-(acryloyloxy)butoxy]benzoate};

4-({4-[4-(acryloyloxy)butoxy]-3,5-dimethylbenzoyl}oxy)-3-methylphenyl 4-[4-(acryloyloxy)butoxy]-2,5-dimethylbenzoate;

2-methylbenzene-1,4-diyl bis{4-[4-(acryloyloxy)butoxy]-3,5-dimethylbenzoate};

2-methoxybenzene-1,4-diyl bis{4-[4-(acryloyloxy)butoxy]-3,5-dimethylbenzoate};

4-({4-[4-(acryloyloxy)butoxy]-3-methylbenzoyl}oxy)-2-methoxyphenyl 4-[4-(acryloyloxy)-butoxy]-3,5-dimethylbenzoate;

2-methoxybenzene-1,4-diyl bis{4-[4-(acryloyloxy)butoxy]-3-methylbenzoate};

4-({4-[4-(acryloyloxy)butoxy]benzoyl}oxy)-3-methoxyphenyl 4-[4-(acryloyloxy)-butoxy]-3-methylbenzoate;

4-({4-[4-(acryloyloxy)butoxy]benzoyl}oxy)-3-methoxyphenyl 4-[4-(acryloyloxy)-butoxy]-2,5-dimethylbenzoate;

2-methoxybenzene-1,4-diyl bis{4-[4-(acryloyloxy)butoxy]-2-methoxybenzoate};

2-methoxybenzene-1,4-diyl bis{4-[4-(acryloyloxy)butoxy]-3,5-dimethoxybenzoate};

2-methoxybenzene-1,4-diyl bis{4-[4-(acryloyloxy)butoxy]-3-methoxybenzoate};

2-ethoxybenzene-1,4-diyl bis{4-[4-(acryloyloxy)butoxy]benzoate};

2-ethoxybenzene-1,4-diyl bis{4-[4-(acryloyloxy)butoxy]-2-methylbenzoate};

2-(propan-2-yloxy)benzene-1,4-diyl bis{4-[4-(acryloyloxy)butoxy]benzoate};

4-({4-[4-(acryloyloxy)butoxy]benzoyl}oxy)-2-(propan-2-yloxy)phenyl 4-[4-(acryloyl-oxy)butoxy]-2-methylbenzoate;

2-(propan-2-yloxy)benzene-1,4-diyl bis{4-[4-(acryloyloxy)butoxy]-2-methylbenzoate};

2-(propan-2-yloxy)benzene-1,4-diyl bis{4-[4-(acryloyloxy)butoxy]-2,5-dimethyl-benzoate};

2-(propan-2-yloxy)benzene-1,4-diyl bis{4-[4-(acryloyloxy)butoxy]-3,5-dimethyl-benzoate}; and 2-(propan-2-yloxy)benzene-1,4-diyl bis{4-[4-(acryloyloxy)butoxy]-3,5-dimethoxy-benzoate}.

The one or more cholesteric (i.e., chiral dopant) compounds B for use in the present invention preferably comprise at least one polymerizable group.

As set forth above, suitable examples of the one or more chiral dopant compounds B include those of formula (I):

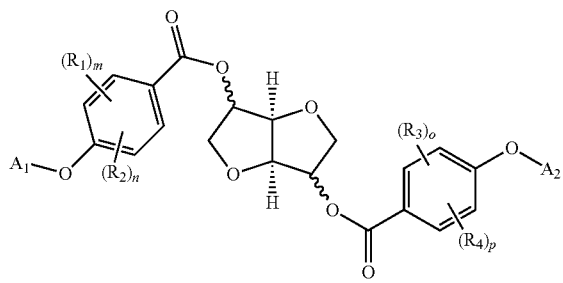

(I)

wherein:

$R_1$, $R_2$, $R_3$, $R_4$, $R_5$, $R_6$, $R_7$ and $R_8$ each independently denote $C_1$-$C_6$ alkyl and $C_1$-$C_6$ alkoxy;

$A_1$ and $A_2$ each independently denote a group of formula (i) to (iii):

$$—[(CH_2)_y\text{-}O]_z—C(O)—CH{=}CH_2; \qquad (i)$$

$$—C(O)\text{-}D_1\text{-}O—[(CH_2)_y—O]_z—C(O)—CH{=}CH_2; \qquad (ii)$$

$$—C(O)\text{-}D_2\text{-}O—[(CH_2)_y—O]_z—C(O)—CH{=}CH_2; \qquad (iii)$$

$D_1$ denotes a group of formula

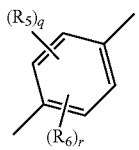

$D_2$ denotes a group of formula

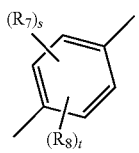

m, n, o, p, q, r, s, and t each independently denote 0, 1, or 2;
y denotes 0, 1, 2, 3, 4, 5, or 6;
z equals 0 if y equals 0 and z equals 1 if y equals 1 to 6.

In one aspect, the one or more chiral dopant compounds B may comprise one or more isomannide derivatives of formula (IA):

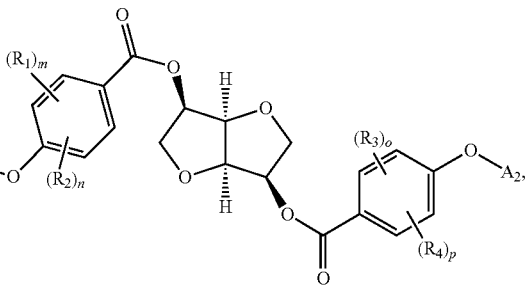

(IA)

wherein:

$R_1$, $R_2$, $R_3$, $R_4$, $R_5$, $R_6$, $R_7$ and $R_8$ each independently denote $C_1$-$C_6$ alkyl and $C_1$-$C_6$ alkoxy;

$A_1$ and $A_2$ each independently denote a group of formula (i) to (iii):

$$—[(CH_2)_y\text{-}O]_z—C(O)—CH{=}CH_2; \qquad (i)$$

$$—C(O)\text{-}D_1\text{-}O—[(CH_2)_y—O]_z—C(O)—CH{=}CH_2; \qquad (ii)$$

$$—C(O)\text{-}D_2\text{-}O—[(CH_2)_y—O]_z—C(O)—CH{=}CH_2; \qquad (iii)$$

$D_1$ denotes a group of formula

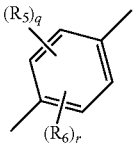

$D_2$ denotes a group of formula

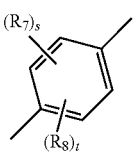

m, n, o, p, q, r, s, and t each independently denote 0, 1, or 2;
y denotes 0, 1, 2, 3, 4, 5, or 6;
z equals 0 if y equals 0 and z equals 1 if y equals 1 to 6.

In one embodiment of the compounds of formula (IA) (and of compounds of formula (I)), $R_1$, $R_2$, $R_3$, $R_4$, $R_5$, $R_6$, $R_7$ and $R_8$ each independently denote $C_1$-$C_6$ alkyl. In an alternative embodiment, $R_1$, $R_2$, $R_3$, $R_4$, $R_5$, $R_6$, $R_7$ and $R_8$ in formula (IA) (and in formula (I)) each independently denote $C_1$-$C_6$ alkoxy.

In another embodiment of the compounds of formula (I) and of formula (IA), $A_1$ and $A_2$ each independently denote a group of formula $—[(CH_2)_y—O]_z—C(O)—CH{=}CH_2$; $R_1$, $R_2$, $R_3$ and $R_4$ each independently denote $C_1$-$C_6$ alkyl; and m, n, o, and p each independently denote 0, 1, or 2. In yet another embodiment, $A_1$ and $A_2$ in formula (I) and formula (IA) each independently denote a group of formula $—[(CH_2)_y—O]_z—C(O)—CH{=}CH_2$; $R_1$, $R_2$, $R_3$ and $R_4$ each independently denote $C_1$-$C_6$ alkoxy; and m, n, o, and p each independently denote 0, 1, or 2.

In another embodiment of the compounds of formula (IA) (and of formula (I)), $A_1$ and $A_2$ each independently denote a group of formula $—C(O)\text{-}D_1\text{-}O—[(CH_2)_y—O]_z—C(O)—$ CH=CH$_2$ and/or of formula —C(O)-D$_2$-O—[(CH$_2$)$_y$—O]$_z$—C(O)—CH=CH$_2$; and R$_1$, R$_2$, R$_3$, R$_4$, R$_5$, R$_6$, R$_7$ and R$_8$ each independently denote C$_1$-C$_6$ alkyl. In an alternative embodiment, A$_1$ and A$_2$ in formula (IA) (and in formula (I)) each independently denote a group of formula —C(O)-D$_1$-O—[(CH$_2$)$_y$—O]$_z$—C(O)—CH=CH$_2$ and/or a group of formula —C(O)-D$_2$-O—[(CH$_2$)$_y$—O]$_z$—C(O)—CH=CH$_2$; and R$_1$, R$_2$, R$_3$, R$_4$, R$_5$, R$_6$, R$_7$ and R$_8$ each independently denote C$_1$-C$_6$ alkoxy.

In another aspect, the one or more chiral dopant compounds B may comprise one or more isosorbide derivatives represented by formula (IB):

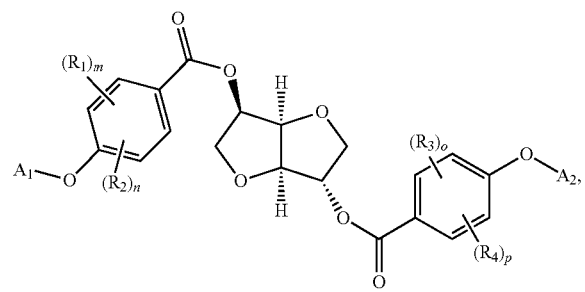

(IB)

wherein:
R$_1$, R$_2$, R$_3$, R$_4$, R$_5$, R$_6$, R$_7$ and R$_8$ each independently denote C$_1$-C$_6$ alkyl and C$_1$-C$_6$ alkoxy;
A$_1$ and A$_2$ each independently denote a group of formula (i) to (iii):

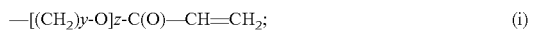 (i)

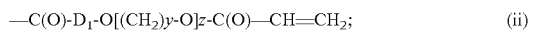 (ii)

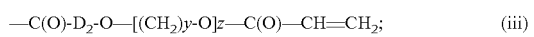 (iii)

D$_1$ denotes a group of formula

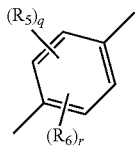

D$_2$ denotes a group of formula

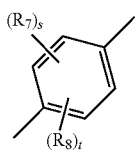

m, n, o, p, q, r, s, and t each independently denote 0, 1, or 2;
y denotes 0, 1, 2, 3, 4, 5, or 6;
z equals 0 if y equals 0 and z equals 1 if y equals 1 to 6.

In one embodiment of the compounds of formula (IB), R$_1$, R$_2$, R$_3$, R$_4$, R$_5$, R$_6$, R$_7$ and R$_8$ each independently denote C$_1$-C$_6$ alkyl. In an alternative embodiment, R$_1$, R$_2$, R$_3$, R$_4$, R$_5$, R$_6$, R$_7$ and R$_8$ in formula (IB) each independently denote C$_1$-C$_6$ alkoxy.

In another embodiment of the compounds of formula (IB), A$_1$ and A$_2$ each independently denote a group of formula —[(CH$_2$)$_y$—O]$_z$—C(O)—CH=CH$_2$; R$_1$, R$_2$, R$_3$ and R$_4$ each independently denote C$_1$-C$_6$ alkyl; and m, n, o, and p each independently denote 0, 1, or 2. In yet another embodiment, A$_1$ and A$_2$ in formula (IB) each independently denote a group of formula —[(CH$_2$)$_y$—O]$_z$—C(O)—CH=CH$_2$; R$_1$, R$_2$, R$_3$ and R$_4$ each independently denote C$_1$-C$_6$ alkoxy; and m, n, o, and p each independently denote 0, 1, or 2.

In another embodiment of the compounds of formula (IB), A$_1$ and A$_2$ each independently denote a group of formula —C(O)-D$_1$-O—[(CH$_2$)$_y$—O]$_z$—C(O)—CH=CH$_2$ and/or of formula —C(O)-D$_2$-O—[(CH$_2$)$_y$—O]$_z$—C(O)—CH=CH$_2$; and R$_1$, R$_2$, R$_3$, R$_4$, R$_5$, R$_6$, R$_7$ and R$_8$ each independently denote C$_1$-C$_6$ alkyl. In an alternative embodiment, A$_1$ and A$_2$ in formula (IB) each independently denote a group of formula —C(O)-D$_1$-O—[(CH$_2$)$_y$—O]$_z$—C(O)—CH=CH$_2$ and/or a group of formula —C(O)-D$_2$-O—[(CH$_2$)$_y$—O]$_z$—C(O)—CH=CH$_2$; and R$_1$, R$_2$, R$_3$, R$_4$, R$_5$, R$_6$, R$_7$ and R$_8$ each independently denote C$_1$-C$_6$ alkoxy.

In a preferred embodiment, the alkyl and alkoxy groups of R$_1$, R$_2$, R$_3$, R$_4$, R$_5$, R$_6$, R$_7$ and R$_8$ in formulae (I), (IA) and (IB) may comprise 3, 4, 6 or 7 carbon atoms and in particular, 4 or 6 carbon atoms.

Examples of alkyl groups comprising 3 or 4 carbon atoms include isopropyl and butyl. Examples of alkyl groups comprising 6 or 7 carbon atoms include hexyl, 2-methylpentyl, 3-methylpentyl, 2,2-dimethylpentyl, and 2,3-dimethylpentyl.

Examples of alkoxy groups comprising 3 or 4 carbon atoms include isopropoxy, but-1-oxy, but-2-oxy, and tert-butoxy. Examples of alkoxy groups comprising 6 or 7 carbon atoms include hex-1-oxy, hex-2-oxy, hex-3-oxy, 2-methylpent-1-oxy, 2-methylpent-2-oxy, 2-methylpent-3-oxy, 2-methylpent-4-oxy, 4-methylpent-1-oxy, 3-methylpent-1-oxy, 3-methylpent-2-oxy, 3-methylpent-3-oxy, 2,2-dimethylpent-1-oxy, 2,2-dimethylpent-3-oxy, 2,2-dimethylpent-4-oxy, 4,4-dimethylpent-1-oxy, 2,3-dimethylpent-1-oxy, 2,3-dimethylpent-2-oxy, 2,3-dimethylpent-3-oxy, 2,3-dimethylpent-4-oxy, and 3,4-dimethylpent-1-oxy.

Non-limiting specific examples of chiral dopant compounds B of formula (I) for use in the present invention include:
(3R,3aR,6R,6aR)-hexahydrofuro[3,2-b]furan-3,6-diyl bis(4-(4-(acryloyloxy)-3-methoxybenzoyl-oxy)-3-methoxybenzoate);
(3R,3aR,6R,6aR)-6-(4-(4-(acryloyloxy)-3-methoxybenzoyloxy)-3-methoxybenzoyloxy)-hexahydrofuro[3,2-b]furan-3-yl 4-(4-(acryloyloxy)benzoyloxy)-3-methoxy-benzoate;
(3R,3aR,6R,6aR)-hexahydrofuro[3,2-b]furan-3,6-diyl bis(4-(4-(acryloyloxy)benzoyloxy)-benzoate);
(3R,3aR,6R,6aR)-hexahydrofuro[3,2-b]furan-3,6-diyl bis(4-(4-(acryloyloxy)butoxy)-benzoate);
(3R,3aR,6R,6aR)-hexahydrofuro[3,2-b]furan-3,6-diyl bis(4-(acryloyloxy)-2-methyl-benzoate);
(3R,3aR,6S,6aR)-hexahydrofuro[3,2-b]furan-3,6-diyl bis(4-(4-(acryloyloxy)benzoyloxy)-3-methoxybenzoate);
(3R,3aR,6R,6aR)-hexahydrofuro[3,2-b]furan-3,6-diyl bis(4-(4-(acryloyloxy)-3-methoxy-benzoyloxy)benzoate);
(3R,3aR,6R,6aR)-hexahydrofuro[3,2-b]furan-3,6-diyl bis(4-(4-(acryloyloxy)benzoyloxy)-3-methoxybenzoate);
2-O-(4-{[4-(acryloyloxy)benzoyl]oxy}-2-methoxybenzoyl)-5-O-(4-{[4-(acryloyloxy)-benzoyl]oxy}-3-methoxybenzoyl)-1,4:3,6-dianhydro-D-mannitol;
2,5-bis-O-(4-{[4-(acryloyloxy)benzoyl]oxy}-2-methoxybenzoyl)-1,4:3,6-dianhydro-D-mannitol;

2-O-(4-{[4-(acryloyloxy)benzoyl]oxy}-2-methoxybenzoyl)-5-O-(4-{[4-(acryloyloxy)-2-methylbenzoyl]oxy}-2-methoxybenzoyl)-1,4:3,6-dianhydro-D-mannitol;

2-O-(4-{[4-(acryloyloxy)benzoyl]oxy}-2-methoxybenzoyl)-5-O-(4-{[4-(acryloyloxy)-3-methylbenzoyl]oxy}-2-methoxybenzoyl)-1,4:3,6-dianhydro-D-mannitol;

2-O-(4-{[4-(acryloyloxy)benzoyl]oxy}-2-methoxybenzoyl)-5-O-(4-{[4-(acryloyloxy)-3-methylbenzoyl]oxy}-2-methoxybenzoyl)-1,4:3,6-dianhydro-D-mannitol;

2-O-(4-{[4-(acryloyloxy)benzoyl]oxy}-2-methoxybenzoyl)-5-O-(4-{[4-(acryloyloxy)-2,5-dimethylbenzoyl]oxy}-2-methoxybenzoyl)-1,4:3,6-dianhydro-D-mannitol;

2-O-(4-{[4-(acryloyloxy)-2,5-dimethylbenzoyl]oxy}-2-methoxybenzoyl)-5-O-(4-{[4-(acryloyloxy)-3-methylbenzoyl]oxy}-2-methoxybenzoyl)-1, 4:3,6-dianhydro-D-mannitol 2-O-(4-{[4-(acryloyloxy)-2-methoxy-5-methylbenzoyl]oxy}-2-methoxybenzoyl)-5-O-(4-{[4-(acryloyloxy)-3-methylbenzoyl]oxy}-2-methoxybenzoyl)-1,4:3,6-dianhydro-D-mannitol;

2-O-(4-{[4-(acryloyloxy)-2-methoxybenzoyl]oxy}-2-methoxybenzoyl)-5-O-(4-{[4-(acryloyloxy)-3-methylbenzoyl]oxy}-2-methoxybenzoyl)-1,4:3,6-dianhydro-D-mannitol;

2-O-(4-{[4-(acryloyloxy)-2-methoxybenzoyl]oxy}-2-methoxybenzoyl)-5-O-(4-{[4-(acryloyloxy)-3-methoxybenzoyl]oxy}-2-methoxybenzoyl)-1,4:3,6-dianhydro-D-mannitol;

2-O-(4-{[4-(acryloyloxy)-2-methoxybenzoyl]oxy}benzoyl)-5-O-(4-{[4-(acryloyloxy)-3-methoxybenzoyl]oxy}benzoyl)-1,4:3,6-dianhydro-D-mannitol;

2,5-bis-O-(4-{[4-(acryloyloxy)benzoyl]oxy}-3-methoxybenzoyl)-1,4:3,6-dianhydro-D-mannitol;

2-O-(4-{[4-(acryloyloxy)-2-methoxybenzoyl]oxy}-2,5-dimethylbenzoyl)-5-O-(4-{[4-(acryloyloxy)-3-methoxybenzoyl]oxy}-3-methylbenzoyl)-1, 4:3,6-dianhydro-D-mannitol;

2-O-(4-{[4-(acryloyloxy)-2-methoxybenzoyl]oxy}-2-methylbenzoyl)-5-O-(4-{[4-(acryloyloxy)-3-methoxybenzoyl]oxy}-3-methylbenzoyl)-1,4:3,6-dianhydro-D-mannitol;

2-O-(4-{[4-(acryloyloxy)-2-methoxy-5-methylbenzoyl]oxy}-2-methylbenzoyl)-5-O-(4-{[4-(acryloyloxy)-5-methoxy-2-methylbenzoyl]oxy}-3-methylbenzoyl)-1,4:3,6-dianhydro-D-mannitol;

2-O-(4-{[4-(acryloyloxy)benzoyl]oxy}-2-ethoxybenzoyl)-5-O-(4-{[4-(acryloyloxy)-3-ethoxybenzoyl]oxy}benzoyl)-1,4:3,6-dianhydro-D-mannitol;

2-O-(4-{[4-(acryloyloxy)benzoyl]oxy}-2-ethoxy-5-methylbenzoyl)-5-O-(4-{[4-(acryloyloxy)-3-ethoxybenzoyl]oxy}benzoyl)-1,4:3,6-dianhydro-D-mannitol;

2-O-(4-{[4-(acryloyloxy)benzoyl]oxy}-2-ethoxy-5-methylbenzoyl)-5-O-(4-{[4-(acryloyloxy)-5-ethoxy-2-methylbenzoyl]oxy}benzoyl)-1,4:3,6-dianhydro-D-mannitol;

2-O-(4-{[4-(acryloyloxy)-3-ethoxybenzoyl]oxy}benzoyl)-5-O-(4-{[4-(acryloyloxy)-2-methylbenzoyl]oxy}-2-ethoxybenzoyl)-1,4:3,6-dianhydro-D-mannitol;

2-O-(4-{[4-(acryloyloxy)-2,5-dimethylbenzoyl]oxy}-2-ethoxybenzoyl)-5-O-(4-{[4-(acryloyloxy)-2-methylbenzoyl]oxy}-2-ethoxybenzoyl)-1,4:3,6-dianhydro-D-mannitol;

2,5-bis-O-(4-{[4-(acryloyloxy)-2,5-dimethylbenzoyl]oxy}-2-ethoxybenzoyl)-1,4:3,6-dianhydro-D-mannitol;

2,5-bis-O-(4-{[4-(acryloyloxy)-2-ethoxybenzoyl]oxy}-2-ethoxybenzoyl)-1,4:3,6-dianhydro-D-mannitol;

2,5-bis-O-(4-{[4-(acryloyloxy)-2-methoxybenzoyl]oxy}-2-ethoxybenzoyl)-1,4:3,6-dianhydro-D-mannitol;

2,5-bis-O-(4-{[4-(acryloyloxy)-2-ethoxybenzoyl]oxy}-2-methoxybenzoyl)-1, 4:3,6-dianhydro-D-mannitol;

2,5-bis-O-(4-{[4-(acryloyloxy)-2-ethoxybenzoyl]oxy}-3-methylbenzoyl)-1, 4:3,6-dianhydro-D-mannitol;

2,5-bis-O-(4-{[4-(acryloyloxy)-2-ethoxybenzoyl]oxy}-3-methoxybenzoyl)-1,4:3,6-dianhydro-D-mannitol;

2,5-bis-O-(4-{[4-(acryloyloxy)-3-methoxybenzoyl]oxy}-3-methoxybenzoyl)-1,4:3,6-dianhydro-D-mannitol;

2,5-bis-O-(4-{[4-(acryloyloxy)-3-methoxybenzoyl]oxy}-3-methoxybenzoyl)-1,4:3,6-dianhydro-D-glucitol;

2-O-(4-{[4-(acryloyloxy)benzoyl]oxy}-2-methoxybenzoyl)-5-O-(4-{[4-(acryloyloxy)-benzoyl]oxy}-3-methoxybenzoyl)-1,4:3,6-dianhydro-D-glucitol;

2,5-bis-O-(4-{[4-(acryloyloxy)benzoyl]oxy}-2-methoxybenzoyl)-1,4:3,6-dianhydro-D-glucitol;

2-O-(4-{[4-(acryloyloxy)benzoyl]oxy}-2-methoxybenzoyl)-5-O-(4-{[4-(acryloyloxy)-2-methylbenzoyl]oxy}-2-methoxybenzoyl)-1,4:3,6-dianhydro-D-glucitol;

2-O-(4-{[4-(acryloyloxy)benzoyl]oxy}-2-methoxybenzoyl)-5-O-(4-{[4-(acryloyloxy)-3-methylbenzoyl]oxy}-2-methoxybenzoyl)-1,4:3,6-dianhydro-D-glucitol;

2-O-(4-{[4-(acryloyloxy)benzoyl]oxy}-2-methoxybenzoyl)-5-O-(4-{[4-(acryloyloxy)-3-methylbenzoyl]oxy}-2-methoxybenzoyl)-1,4:3,6-dianhydro-D-glucitol;

2-O-(4-{[4-(acryloyloxy)benzoyl]oxy}-2-methoxybenzoyl)-5-O-(4-{[4-(acryloyloxy)-2,5-dimethylbenzoyl]oxy}-2-methoxybenzoyl)-1,4:3,6-dianhydro-D-glucitol;

2-O-(4-{[4-(acryloyloxy)-2,5-dimethylbenzoyl]oxy}-2-methoxybenzoyl)-5-O-(4-{[4-(acryloyloxy)-3-methylbenzoyl]oxy}-2-methoxybenzoyl)-1,4:3,6-dianhydro-D-glucitol;

2-O-(4-{[4-(acryloyloxy)-2-methoxy-5-methylbenzoyl]oxy}-2-methoxybenzoyl)-5-O-(4-{[4-(acryloyloxy)-3-methylbenzoyl]oxy}-2-methoxybenzoyl)-1,4:3,6-dianhydro-D-glucitol;

2-O-(4-{[4-(acryloyloxy)-2-methoxybenzoyl]oxy}-2-methoxybenzoyl)-5-O-(4-{[4-(acryloyloxy)-3-methylbenzoyl]oxy}-2-methoxybenzoyl)-1,4:3,6-dianhydro-D-glucitol;

2,5-bis-O-(4-{[4-(acryloyloxy)benzoyl]oxy}-3-methoxybenzoyl)-1,4:3,6-dianhydro-D-glucitol;

2-O-(4-{[4-(acryloyloxy)-2-methoxybenzoyl]oxy}-2-methoxybenzoyl)-5-O-(4-{[4-(acryloyloxy)-3-methoxybenzoyl]oxy}-2-methoxybenzoyl)-1,4:3,6-dianhydro-D-glucitol;

2-O-(4-{[4-(acryloyloxy)-2-methoxybenzoyl]oxy}benzoyl)-5-O-(4-{[4-(acryloyloxy)-3-methoxybenzoyl]oxy}benzoyl)-1,4:3,6-dianhydro-D-glucitol;

2-O-(4-{[4-(acryloyloxy)-2-methoxybenzoyl]oxy}-2,5-dimethylbenzoyl)-5-O-(4-{[4-(acryloyloxy)-3-methoxybenzoyl]oxy}-3-methylbenzoyl)-1,4:3,6-dianhydro-D-glucitol;

2-O-(4-{[4-(acryloyloxy)-2-methoxybenzoyl]oxy}-2-methylbenzoyl)-5-O-(4-{[4-(acryloyloxy)-3-methoxybenzoyl]oxy}-3-methylbenzoyl)-1,4:3,6-dianhydro-D-glucitol;

2-O-(4-{[4-(acryloyloxy)-2-methoxy-5-methylbenzoyl]oxy}-2-methylbenzoyl)-5-O-(4-{[4-(acryloyloxy)-5-methoxy-2-methylbenzoyl]oxy}-3-methylbenzoyl)-1,4:3, 6-dianhydro-D-glucitol;

2-O-(4-{[4-(acryloyloxy)benzoyl]oxy}-2-ethoxybenzoyl)-5-O-(4-{[4-(acryloyloxy)-3-ethoxybenzoyl]oxy}benzoyl)-1,4:3,6-dianhydro-D-glucitol;

2-O-(4-{[4-(acryloyloxy)benzoyl]oxy}-2-ethoxy-5-methylbenzoyl)-5-O-(4-{[4-(acryloyloxy)-3-ethoxybenzoyl]oxy}benzoyl)-1,4:3,6-dianhydro-D-glucitol;

2-O-(4-{[4-(acryloyloxy)benzoyl]oxy}-2-ethoxy-5-methylbenzoyl)-5-O-(4-{[4-(acryloyloxy)-5-ethoxy-2-methylbenzoyl]oxy}benzoyl)-1,4:3,6-dianhydro-D-glucitol 2-O-(4-{[4-(acryloyloxy)-3-ethoxybenzoyl]oxy}benzoyl)-5-O-(4-{[4-(acryloyloxy)-2-methylbenzoyl]oxy}-2-ethoxybenzoyl)-1,4:3,6-dianhydro-D-glucitol;

2-O-(4-{[4-(acryloyloxy)-2,5-dimethylbenzoyl]oxy}-2-ethoxybenzoyl)-5-O-(4-{[4-(acryloyloxy)-2-methylbenzoyl]oxy}-2-ethoxybenzoyl)-1,4:3,6-dianhydro-D-glucitol 2,5-bis-O-(4-{[4-(acryloyloxy)-2,5-dimethylbenzoyl]oxy}-2-ethoxybenzoyl)-1,4:3,6-dianhydro-D-glucitol;

2,5-bis-O-(4-{[4-(acryloyloxy)-2-ethoxybenzoyl]oxy}-2-ethoxybenzoyl)-1,4:3,6-dianhydro-D-glucitol;

2,5-bis-O-(4-{[4-(acryloyloxy)-2-methoxybenzoyl]oxy}-2-ethoxybenzoyl)-1,4:3,6-dianhydro-D-glucitol;

2,5-bis-O-(4-{[4-(acryloyloxy)-2-ethoxybenzoyl]oxy}-2-methoxybenzoyl)-1,4:3,6-dianhydro-D-glucitol;

2,5-bis-O-(4-{[4-(acryloyloxy)-2-ethoxybenzoyl]oxy}-3-methylbenzoyl)-1,4:3,6-dianhydro-D-glucitol; and 2,5-bis-O-(4-{[4-(acryloyloxy)-2-ethoxybenzoyl]oxy}-3-methoxybenzoyl)-1,4:3,6-dianhydro-D-glucitol.

The one or more chiral dopant compounds B will usually be present in a total concentration of from about 0.1% to about 30% by weight, e.g., from about 0.1% to about 25%, or from about 0.1% to about 20% by weight, based on the total weight of the composition. For example, in the case of inkjet printing the best results will often be obtained with concentrations of from 3% to 10% by weight, e.g., from 5% to 8% by weight, based on the total weight of the composition. The one or more nematic compounds A will often be present in a concentration of from about 30% to about 50% by weight, based on the total weight of the composition.

Especially in cases where the first modifying agent is capable of changing the position of a selective reflection band exhibited by a salt-containing cured chiral liquid crystal precursor composition a further component of the chiral liquid crystal precursor composition for use in the present invention is a salt and in particular, a salt that is capable of changing the position of the selective reflection band exhibited by the cured chiral liquid crystal precursor composition (in the chiral liquid crystal state) compared to the position of the selective reflection band exhibited by the cured composition without the salt. In this regard, the explanations in U.S. Provisional Patent Application Nos. 61/420,580 and 61/420,582, both filed Dec. 7, 2010, the entire disclosures of which are expressly incorporated by reference herein, may be referred to. Regarding the selective reflection band exhibited by a chiral liquid crystal polymer composition the explanations in U.S. Pat. No. 7,742,136 or US 2010/0025641, the entire disclosures of which are expressly incorporated by reference herein, may, for example, be referred to.

The extent to which the position of the selective reflection band exhibited by a given cured chiral liquid crystal precursor composition can be shifted by the presence of a salt depends on various factors such as, inter alia, the cation of the salt, the anion of the salt, and the concentration of the salt per gram of dry extract. Usually it is preferred for a salt to be present in a given chiral liquid crystal precursor composition at a concentration which shifts the position of the selective reflection band exhibited by a cured chiral liquid crystal precursor composition by at least about 5 nm, e.g., by at least about 10 nm, by at least about 20 nm, by at least about 30 nm, by at least about 40 nm, or by at least about 50 nm. Suitable (total) salt concentrations are often within the range of from about 0.01% to about 10% by weight, e.g., from about 0.1% to about 5% by weight, based on the solids content of the chiral liquid crystal precursor composition. Salt concentrations above the indicated ranges are often difficult to achieve due to the limited solubility of the salt in the chiral liquid crystal precursor composition.

Non-limiting examples of suitable salts include salts which comprise a metal cation (main group metals, transition metals, lanthanides and actinides). For example, the metal may be an alkali or alkaline earth metal such as, e.g., Li, Na. Li salts are particularly preferred. Further non-limiting examples of suitable salts include quaternary ammonium salts such as tetraalkylammonium salts. Examples of suitable anions include "regular" ions such as, e.g., halide (e.g., fluoride, chloride, bromide, iodide), perchlorate, nitrate, nitrite, sulfate, sulfonate, sulfite, carbonate, bicarbonate, cyanide, cyanate, and thiocyanate, as well as complex ions such as, e.g., tetrafluoroborate. Specific but non-limiting examples of suitable salts include lithium perchlorate, lithium nitrate, lithium tetrafluoroborate, lithium bromide, lithium chloride, tetrabutylammonium perchlorate, tetrabutylammonium chloride, tetrabutylammonium tetrafluoroborate, tetrabutylammonium bromide, sodium carbonate, sodium chloride, and sodium nitrate. Of course, mixtures of two or more salts (e.g., two, three, four or more salts) may be used as well. If two or more salts are present, they may or may not comprise the same cation and/or the same anion. In an other aspect, the at least one salt may comprise lithium perchlorate and/or lithium bromide.

A non-limiting example of a first modifying agent for use in the present invention includes a substance and in particular, a resin that is capable of changing the position of the selective reflection band exhibited by a cured chiral liquid crystal precursor composition which contains a salt that is capable of changing the position of the selective reflection band exhibited by the cured chiral liquid crystal precursor composition (in the chiral liquid crystal state) compared to the position of the selective reflection band exhibited by the cured composition without the salt. Such a resin will hereafter be referred to as "modifying resin." In this regard, the detailed explanations in U.S. Provisional Patent Application Nos. 61/420,580 and 61/420,582, may again be referred to.

The modifying resin for use as a first modifying agent in the present invention will usually be arranged between the substrate and the chiral liquid crystal precursor composition (and in direct contact with the latter). A modifying resin for use in the present invention is not particularly limited as long as it is capable of changing at least one optical property that is exhibited by the cured chiral liquid crystal precursor composition on the substrate to a noticeable extent. In this regard, it is preferred for the modifying resin to at least be capable of shifting the position of the selective reflection band as represented by $\lambda_{max}$ and in particular, to be capable of shifting $\lambda_{max}$ by at least about 5 nm, e.g., by at least about 10 nm, by at least about 20 nm, by at least about 30 nm, by at least about 40 nm, or by at least about 50 nm. This capability depends on various factors such as, inter alia, the components of the chiral liquid crystal precursor composition, for example, the salt(s) and the chiral dopant(s) comprised therein, and the presence (or absence) of functional groups in the modifying resin (and thus on the surface thereof).

Examples of modifying resins which are suitable for use as first modifying agent in the present invention include those made from one or more (e.g., one, two, three, or four) polymerizable monomers which include one or more (e.g., one, two or three) heteroatoms selected from, e.g., O, N, or S. In this regard, it is to be appreciated that the polymerizable monomers are not limited to those which are polymerizable by free radical polymerization. Rather, these monomers also include, for example, monomers which are polymerizable by cationic and/or anionic polymerization and/or by polycondensation. Accordingly, non-limiting examples of resins which are suitable for the purposes of the present invention include organic resins such as polyacrylates, polymethacrylates, polyvinylethers, polyvinylesters, polyesters, polyethers, polyamides, polyurethanes, polycarbonates, polysulfones, phenolic resins, epoxy resins, and mixed forms of these resins. Mixed inorganic/organic resins such as silicones (e.g., polyorganosiloxanes) are suitable as well. One particular type of resin that can be used in the present invention are aqueous resins such as, e.g., polyamide resins (for example CAS No 175893-71-7, CAS No 303013-12-9, CAS No 393802-62-5, CAS No 122380-38-5, CAS No 9003-39-8).

Non-limiting examples of modifying resins for use as first modifying agent in the present invention further include those which are made from one or more monomers selected from polyether acrylates, modified polyether acrylates (such as, e.g., amine-modified polyether acrylates), polyester acrylates, modified polyester acrylates (such as, e.g., amine-modified polyester acrylates), hexafunctional polyester acrylates, tetrafunctional polyester acrylates, aromatic difunctional urethane acrylates, aliphatic difunctional urethane acrylates, aliphatic trifunctional urethane acrylates, aliphatic hexafunctional urethane acrylates, urethane monoacrylates, aliphatic diacrylates, bisphenol A epoxy acrylates, modified bisphenol A epoxy acrylates, epoxy acrylates, modified epoxy acrylates (such as, e.g., fatty acid modified epoxy acrylates), acrylic oligomers, hydrocarbon acrylate oligomers, ethoxylated phenol acrylates, polyethylene glycol diacrylates, propoxylated neopentyl glycol diacrylates, diacrylated bisphenol A derivatives, dipropylene glycol diacrylates, hexanediol diacrylates, tripropylene glycol diacrylates, polyether tetraacrylates, ditrimethylol propane tetraacrylates, dipentaerythritol hexaacrylates, mixtures of pentaerythritol tri- and tetraacrylates, dipropylene glycol diacrylates, hexanediol diacrylates, ethoxylated trimethylol propane triacrylates, and tripropylene glycol diacrylates (optionally in combination with one or more monomers which are different from the above monomers).

It is to be appreciated that a modifying resin for use in the present invention does not have to be completely cured (polymerized) or dried before it is contacted with a chiral liquid crystal precursor composition as long as it is able to withstand the components and in particular, the solvent that may be (and usually will be) present in the (uncured) chiral liquid crystal precursor composition (e.g., that the modifying resin does not get dissolved thereby to any significant extent). The curing of an only partially cured modifying resin may be completed, for example, together with the curing of the chiral liquid crystal precursor (e.g., by UV-radiation).

One of the advantages of the present invention over the existing prior art (as illustrated in, e.g., WO 2001/024106, WO 2008/127950, the entire disclosures of which are incorporated by reference herein) is the ability to create perfect register without using mask techniques. By perfect register is meant the possibility to have in very few steps and/or process (es) steps a single layer of liquid crystal polymer wherein two or more zones with simultaneously different color shifting properties and/or different positions of the selective reflection band are present, and these zones can be perfectly adjacent without either a gap or an overlap between them. This advantage stems from the fact that the chiral liquid crystal precursor composition is applied in one step, and its properties are locally modified by the modifying resin. To obtain a similar result without the instant method, one would have to apply and cure two or more chiral liquid crystal precursor compositions in successive steps with excessively high precision in order for them to cover adjacent regions without gaps or overlaps. The instant method allows straightforward creation of logo, marking, coding, barcode, pattern, data matrix, etc. which contains different information and/or color at the same time. The possibilities afforded by the instant method include using mixtures of modifying resins (e.g., mixtures of two, three, four or more modifying resins), both in the form of cured physical mixtures of two or more modifying resins and in the form of two or more different modifying resins which are (separately) present on different locations of the surface of the substrate.

Alternatively or additionally, two or more different chiral liquid crystal precursor compositions which differ, for example, in the concentration of salt(s) contained therein and/or differ by containing different salts therein may also be used. This alone gives rise to a large number of possible combinations of chiral liquid crystal precursor compositions and modifying resins which may be present on the surface of a single substrate. This large number of possible combinations allows, among others, the possibility of creating a specific code and/or marking which is difficult to counterfeit because anyone who wants to reproduce it would have to know the exact composition of the chiral liquid crystal precursor compositions, the type, amount, and concentration of salt(s) contained therein and the nature of the modifying resin(s). The already large number of possible combinations can be further (and significantly) increased by using more than one second modifying agent in combination with one or more (or each) of the combinations of chiral liquid crystal precursor composition(s) and first modifying agent(s). The incorporation of additional specific security elements such as, e.g., near-infrared, infrared and/or UV security elements, magnetic particles, pigments in at least two different size ranges such as, e.g., "normal" size and nanoscale pigments (known exclusively to the producer of the marking) into the chiral liquid crystal precursor composition and/or into the modifying resin, makes counterfeiting even more difficult. Accordingly, the present invention also contemplates and encompasses the use of chiral liquid crystal precursor compositions and modifying resins which comprise such additional specific security elements.

It also is to be appreciated that the present invention is not limited to the visible range of the electromagnetic spectrum. For example, a modifying resin for use in the present invention may shift all or a part of the selective reflection band exhibited by a cured chiral liquid crystal precursor composition from the IR range to the visible range, or from the visible range to the UV range, or from the IR range to the UV range, and vice versa e.g from UV to visible.

The chiral liquid crystal precursor composition and the composition for making the modifying resin or other first modifying agent can be applied onto the surface of the substrate or item by any suitable method such as, for example, spray coating, knife coating, roller coating, screen coating, curtain coating, gravure printing, flexography, offset printing, dry offset printing, letterpress printing, screen-printing, pad printing, and ink-jet printing (for example continuous ink-jet printing, drop-on-demand ink-jet printing, valve-jet printing). In one of the embodiments of the present invention the application (e.g., deposition) of a composition for making the layer or pattern and/or a composition for making the modifying resin is carried out with a printing technique such as, e.g., ink jet printing (continuous, drop-on-demand, etc.), flexography, pad printing, rotogravure printing, screen-printing, etc. Of course, other printing techniques known by those of skill in the art of printing may be used as well. In one of the preferred embodiments of the invention flexography printing is employed both for applying the modifying resin and for applying the chiral liquid crystal precursor composition. In another preferred embodiment of the invention, ink jet printing techniques are used both for applying the modifying resin and for applying the chiral liquid crystal precursor composition. It also is contemplated that two different techniques can be used respectively to apply the modifying resin and the chiral liquid crystal precursor composition. The industrial ink jet printers, commonly used for numbering, coding and marking applications on conditioning lines and printing presses, are particularly suitable. Preferred ink-jet printers include single nozzle continuous ink jet printers (also called raster or multi level deflected printers) and drop-on-demand ink-jet printers, in particular valve-jet printers. The thickness of the applied liquid crystal polymer composition, after curing, according to the above described application techniques, will usually be at least about 1 µm, e.g., at least about 2 µm, or at least about 3 µm or at least about 4 µm, and will usually be not more than about 20 µm, e.g., not more than about 15 µm, not more than about 10 µm, or not more than about 6 µm. The thickness of the applied modifying resin, after curing, according to the above described application techniques will usually be at least about 1 µm, e.g., at least about 2 µm or at least about 3 µm, or at least about 5 µm, but will usually be not more than about 10 µm.

In particular if a composition for use in the present invention (i.e., a composition for making a chiral liquid crystal precursor or a composition for making a modifying resin) is to be applied by the printing techniques set forth above the composition will usually comprise a solvent to adjust its viscosity to a value which is suitable for the employed application (printing) technique. Typical viscosity values for flexographic printing of the composition used in the present invention are in the range of from about 10 seconds to about 120 seconds, preferably 10 to 100 seconds, more preferably 10 to 60 seconds even more preferably 10 to 40 seconds using e.g. a cup DIN number 4 at 25° C. Suitable solvents are known to those of skill in the art. Non-limiting examples thereof include low-viscosity, slightly polar and aprotic organic solvents, such as, e.g., methyl ethyl ketone (MEK), acetone, cyclohexanone, ethyl acetate, ethyl 3-ethoxypropionate, and mixtures of two or more thereof.

Further, in particular if a composition for use in the present invention (i.e., a composition for making a chiral liquid crystal precursor or a composition for making a modifying resin) is to be applied by (continuous) ink-jet printing, the composition will usually also comprise at least one conductivity agent known by those of skill in the art.

If a chiral liquid crystal precursor composition and/or a composition for making a modifying resin for use in the present invention is to be cured/polymerized by UV radiation the composition will also comprise at least one photoinitiator. Non-limiting examples of the many suitable photoinitiators include α-hydroxyketones such as 1-hydroxy-cyclohexyl-phenyl-ketone and a mixture (e.g., about 1:1) of 1-hydroxy-cyclohexyl-phenyl-ketone and one or more of benzophenone, 2-hydroxy-2-methyl-1-phenyl-1-propanone, and 2-hydroxy-1-[4-(2-hydroxyethoxy)phenyl]-2-methyl-1-propanone; phenylglyoxylates such as methylbenzoylformate and a mixture of oxy-phenyl-acetic acid 2-[2-oxo-2-phenyl-acetoxy-ethoxy]-ethyl ester and oxy-phenyl-acetic 2-[2-hydroxy-ethoxy]-ethyl ester; benzyldimethyl ketals such as alpha, alpha-dimethoxy-alpha-phenylacetophenone; α-aminoketones such as 2-benzyl-2-(dimethylamino)-1-[4-(4-morpholinyl)phenyl]-1-butanone and 2-methyl-1-[4-(methylthio)phenyl]-2-(4-morpholinyl)-1-propanone; with the above cited photoinitiators the composition may further comprise co-initiators such as phosphine oxide and phosphine oxide derivatives such as diphenyl(2,4,6-trimethylbenzoyl)-phosphine oxide; phenyl bis(2,4,6-trimethylbenzoyl) supplied by Ciba; and also thioxanthone derivatives such as Speedcure ITX (CAS 142770-42-1), Speedcure DETX (CAS 82799-44-8), Speedcure CPTX (CAS 5495-84-1-2 or CAS 83846-86-0) supplied by Lambson.

If a composition for use in the present invention (i.e., a composition for making a chiral liquid crystal precursor or a composition for making a modifying resin) is to be cured by a method which is different from irradiation with UV light such as, e.g., by means of high-energy particles (e.g., electron beams), X-rays, gamma-rays, etc. the use of a photoinitiator can, of course, be dispensed with.

It may also be possible or even desirable to cure especially the composition for making a modifying resin thermally. In this case the composition will usually contain at least one thermal polymerization initiator such as, e.g., a peroxide or an azo compound. Other examples of thermal polymerization initiators are well known to those of skill in the art.

A chiral liquid crystal precursor composition and a composition for providing a modifying resin for use in the present invention may also comprise a variety of other optional components which are suitable and/or desirable for achieving a particular desired property of the composition and in general, may comprise any components/substances which do not adversely affect a required property of the composition to any significant extent. Non-limiting examples of such optional components are resins, silane compounds, adhesion promoters, sensitizers for the photoinitiators (if present), etc. For example, especially a chiral liquid crystal precursor composition for use in the present invention may comprise one or more silane compounds. Non-limiting examples of suitable silane compounds include optionally polymerizable silanes such as those of formula $R_1R_2R_3$—Si—$R_4$ wherein $R_1$, $R_2$, and $R_3$ independently represent alkoxy and alkoxyalkoxy having a total of from 1 to about 6 carbon atoms and $R_4$ represents vinyl, allyl, $(C_{1-10})$alkyl, (meth)acryloxy$(C_{1-6})$alkyl, and glycidyloxy$(C_{1-6})$alkyl such as, e.g., vinyltriethoxysilane, vinyltrimethoxysilane, vinyltris(2-methoxyethoxy) silane, 3-methacryloxypropyl-trimethoxysilane, octyltriethoxysilane, and 3-glycidyloxypropyl triethoxysilane from the Dynasylan® family supplied by Evonik.

The concentration of the one or more silane compounds, if present, in the chiral liquid crystal precursor composition will usually be from about 0.5% to about 5% by weight, based on the total weight of the composition.

In order to strengthen the security of the marking according to the present invention a composition for making a modifying resin and/or a composition for making a chiral liquid crystal precursor for use in the present invention may further comprise one or more pigments and/or dyes which absorb in the visible or invisible region of the electromagnetic spectrum and/or one or more pigments and/or dyes which are luminescent and/or one or more magnetic particles and/or one or more pigments in different size ranges (e.g., "normal" size and nanoscale pigments). Non-limiting examples of suitable pigments and/or dyes which absorb in the visible or invisible region of the electromagnetic spectrum include phthalocyanine derivatives. Non-limiting examples of suitable luminescent pigments and/or dyes include lanthanide derivatives. Non-limiting examples of suitable magnetic pigments include particles of transitional metal oxides such as iron and chromium oxides. The presence of pigment(s) and/or dye(s) will enhance and reinforce the security of the marking against counterfeiting.

Following the application of the chiral liquid crystal precursor composition in the form of a layer or a pattern on the surface of the substrate or item carrying the one or more first modifying agents in the one or more first areas the composition may be brought to a chiral liquid crystal state exhibiting the initial set of optical properties (and the first modified set of optical properties in the one or more first areas). To that end the chiral liquid crystal precursor composition is heated, whereby the solvent contained in the composition, if present, is evaporated and the promotion of the desired chiral liquid crystal state takes place. The temperature used to evaporate the solvent and to promote the formation of the liquid crystal state depends on the components of the chiral liquid crystal precursor composition and will in many cases range from about 55° C. to about 150° C., e.g., from about 55° C. to about 100° C., preferably from about 60° C. to about 100° C. Examples of suitable heating sources include conventional heating means such as a hot plate, an oven, a stream of hot air and in particular, radiation sources such as, e.g., an IR lamp. The required heating time depends on several factors such as, e.g., the components of the chiral liquid crystal precursor composition, the type of heating device and the intensity of the heating (energy output of the heating device). In many cases a heating time of from about 0.1 s, about 0.5 s, or about 1 second to about 30 seconds such as, e.g., not more than about 20 seconds, not more than about 10 seconds, or not more than about 5 seconds will be sufficient.

Following the formation of the chiral liquid crystal state the second modifying agent(s) may be applied onto the one or more second areas of the composition in the initial chiral liquid crystal state (and optionally also onto one or more of the one or more first areas or parts thereof). The second modifying agent is capable of changing the initial chiral liquid crystal state (optionally upon heating, depending on the type of the second modifying agent) and the first modified chiral liquid crystal state (if applied to a first area or a part thereof). The second modifying agent may be applied while the chiral liquid crystal precursor composition is still in a heated state (e.g., immediately following the completion of the heating operation) or may be applied after the chiral liquid crystal precursor composition has cooled down to at least some extent (e.g., is at substantially room temperature). If desired, the cooling of the chiral liquid crystal precursor composition can be accelerated by means known to those of skill in the art such as, e.g., by blowing ambient air onto the previously heated composition. Applying the second modifying agent to the chiral liquid crystal precursor composition in a cooled-down state may improve the resolution of the marking. On the other hand, applying the second modifying agent immediately after completion of the heating operation may be desirable if the entire process of making the marking is to be conducted in an as simple and speedy as possible manner.

The second modifying agent for use in the present invention will not extract any of the compounds which form the initial or first modified chiral liquid crystal state and will also not modify the chemical structure of these compounds to any significant extent (and preferably, not at all). Without wishing to be bound by any theory, it is speculated that at least some of the second modifying agents that can be employed will initiate a very localized and controlled reorganization of the chiral liquid crystal state.

In the marking according to the present invention the second modifying agent usually will, depending on its nature, modify the initial (unmodified) chiral liquid crystal state (and, if applied in one of the one or more first areas or parts thereof, also the first modified chiral liquid crystal state) from a (predominantly or substantially) anisotropic state which is characterized by specific optical properties to:

(i) a (predominantly or substantially) isotropic liquid crystal state where the color shifting properties of the chiral liquid crystal state are substantially absent and/or no longer detectable with the unaided eye (as provided by, e.g., a species I modifying agent set forth below), or (ii) a (second) modified chiral liquid crystal state exhibiting a second modified set of optical properties with at least one optical property that is different from a corresponding optical property of the initial chiral liquid crystal state (as provided by, e.g., a species II or species III modifying agent set forth below).

The second modifying agent may, for example, be a "species I" modifying agent. A species I modifying agent will usually comprise one or more aprotic organic compounds which are liquid at room temperature and preferably have a relatively high dipole moment and a relatively high dielectric constant. Non-limiting examples thereof include ketones having from 3 to about 6 carbon atoms, alkyl esters and dialkylamides of carboxylic acids which comprise a total of from 2 to about 6 carbon atoms, dialkyl sulfoxides comprising a total of from 2 to about 4 carbon atoms, and optionally substituted (e.g., alkyl-substituted) nitrobenzene such as, e.g., dimethyl ketone, methyl ethyl ketone, ethyl acetate, dimethyl formamide, dimethyl sulfoxide, nitrobenzene, nitrotoluene, and mixtures of two or more thereof. Preferred compounds for use in or as species I modifying agent include acetone, methyl ethyl ketone and ethyl acetate.

A species I modifying agent for use in the present invention may further comprise one or more resins to adjust its viscosity. Of course, the resin(s) must be compatible with the application (e.g., printing) technique that is to be employed. Non-limiting examples of resins which may be suitable, depending on the particular circumstances, include polyesters resins such as, e.g, DYNAPOL® L 1203, L 205, L 206, L 208, L 210, L 411, L 651, L658, L 850, L 912, L 952, LH 530, LH 538, LH 727, LH 744, LH 773, LH 775, LH 818, LH 820, LH 822, LH 912, LH 952, LH 530, LH 538, LH 727, LH 744, LH 773, LH 775, LH 818, LH 820, LH 822, LH 823, LH 826, LH 828, LH 830, LH 831, LH 832, LH 833, LH 838, LH898, LH 908, LS436, LS615, P1500, S1218, S1227, S1247, S1249, S1252, S1272, S1401, S1402, S1426, S1450, S1510, S1606, S1611, S243, S320, S341, S361, 5394, and S EP1408 from Evonik. Other suitable resins known to those of skill in the art may be used as well. In a preferred embodiment the one or more resins are selected from DYNAPOL® L 1203, L 205, L 206, L 208, L 210, L 411, L 651, L658, L 850, L 912, L 952, LH 530, LH 538, LH 727, LH 744 from Evonik. A typical concentration range for the one or more resins is from about 3% to about 15% by weight, based on the total weight of the species I modifying agent.

The species I modifying agent may further comprise one or more conductivity agents such as, e.g., salts which are to impart sufficient conductivity to the species I modifying agent so as to allow its use in combination with a printer such as, e.g., a continuous ink jet printer. Examples of suitable conductivity agents include those which are set forth above as examples of conductivity agents for use in the chiral liquid crystal precursor composition of the present invention such as, e.g., tetrabutyl ammonium nitrate, tetrabutyl ammonium perchlorate, tetrabutyl ammonium hexafluorophosphate, potassium hexafluorophosphate, potassium thiocyanate, lithium perchlorate and other conductivity agents known in the art.

When the species I modifying agent comprises a solvent or a solvent mixture, after the evaporation of the solvent the initial chiral liquid crystal state (and also the first modified chiral liquid crystal state, if applicable) will locally (in the one or more second areas) change from a (predominantly or substantially) optically anisotropic state to a (predominantly or substantially) optically isotropic state.

The second modifying agent may further be a "species II" modifying agent, i.e., a (second) chiral liquid crystal precursor composition. The chiral liquid crystal precursor composition for application in one or more second areas of the chiral liquid precursor composition may be the same as or different from the base chiral liquid precursor composition to be modified. Further, everything that is set forth above with respect to the base chiral liquid precursor composition (e.g., components, application methods, etc.) applies equally and without exception also to the chiral liquid precursor composition for us as a second modifying agent (species II modifying agent). For example, as in the case of the base chiral liquid crystal precursor composition the one or more chiral dopant compounds B will usually be present in the species II modifying agent in a total concentration of from about 0.1% to about 30% by weight, e.g., from about 0.1% to about 25%, or from about 0.1% to about 20% by weight, based on the total weight of the species II modifying agent. Also, the one or more nematic compounds A will often be present in the species II modifying agent in a concentration of from about 30% to about 50% by weight, based on the total weight of the species II modifying agent.

If the species II modifying agent is different from the base chiral liquid crystal precursor composition to be modified the one or more differences may relate to, e.g., one or more of the compounds A and B and/or a salt as described in [0114] that are present in these compositions and/or to the concentrations of one or more of these compounds. For example, a or the only difference between these compositions may be that one or more (or all) of the chiral dopant compounds B are present in the species II modifying agent in a concentration/concentrations that is/are different from the corresponding concentration/concentrations in the base composition. Further, a or the only difference between these compositions may be that the one or more chiral dopant compounds B in the base composition are of formula (I) above and/or related formulae and at least one of the one or more chiral dopant compounds B in the species II modifying agent is different from formula (I) and/or related formulae. For example, at least one of the one or more chiral dopant compounds B in the species II modifying agent may be an isosorbide or isomannide derivative as described in, e.g., EP-B-0 847 432, GB-A-2 330 139, and U.S. Pat. No. 6,589,445, the entire disclosures of which are incorporated by reference herein.

It is to be appreciated here that if the species II modifying agent is different from the base chiral liquid crystal precursor composition it may also be applied to one or more areas on the surface of the substrate or item which do not carry the base composition (but may optionally carry a first modifying agent). In this way a further variability in the marking of the present invention may be created, i.e., one or more areas with a species II modifying agent in a chiral liquid crystal state (obtained after renewed heating) and/or one or more areas with a species II modifying agent whose chiral liquid crystal state (formed after heating) is modified by the first modifying agent.

After the application (e.g. deposition) of the species H modifying agent to the one or more second areas of the base chiral liquid crystal precursor composition in the chiral liquid crystal state the system is brought to a second modified chiral liquid crystal state to obtain the second modified set of optical properties in the one or more second areas. To that end at least the one or more second areas is heated, whereby the solvent contained in the species II modifying agent, if present, is evaporated and the promotion of the desired second modified chiral liquid crystal state in the one or more second areas takes place. The temperature used to evaporate the solvent and to promote the formation of the second modified chiral liquid crystal state depends on the components of the species II modifying agent and will in many cases range from about 55° C. to about 150° C., e.g., from about 55° C. to about 100° C., preferably from about 60° C. to about 100° C. Examples of suitable heating sources include conventional heating means and in particular, radiation sources such as, e.g., an IR lamp.

It is to be appreciated here that in the case of using a species II modifying agent i.e., a (second) chiral liquid crystal precursor composition, as a second modifying agent the marking according to the present invention is not identical or comparable to a simple superposition of two chiral nematic liquid crystal layers. This constitutes a significant difference over the prior art. In particular, when the base chiral liquid crystal precursor composition is deposited on a substrate and brought to the initial chiral liquid crystal state this state is characterized by a pitch p1. Likewise, when the second chiral liquid crystal precursor composition (species II modifying agent) is deposited on one or more second areas of the base composition and brought to the second modified chiral liquid crystal state the second modified state is characterized by a pitch p2 (which may be the same or different from p1). In this regard, it is pointed out that the product that is obtained after curing/polymerizing in the process of the present invention is not a superposition of a first chiral liquid crystal state having a pitch p1 and a second chiral liquid crystal state having a pitch p2. Rather, an area carrying the second chiral liquid crystal precursor composition, once brought to the second modified chiral liquid crystal state, has a pitch p2' which is different from p1 and p2 but it is somewhat dependent on the nature of p1.

In yet another embodiment of the present invention the second modifying agent may be a "species III" modifying agent, i.e., a chiral dopant composition. The chiral dopant composition preferably comprises one or more (e.g., one, two, three or four) chiral dopant compounds C of formula (I) set forth above and/or related formulae. In a more preferred embodiment the chiral dopant composition comprises at least one chiral dopant compound C and at least one other chiral dopant compound D which is different from a compound of formula (I) and related formulae. The at least one chiral dopant compound D may be selected, for example, from the derivatives of isosorbides and isomannides which are disclosed in, e.g., EP-B-0 847 432, GB-A-2 330 139, and U.S. Pat. No. 6,589,445, the entire disclosures of which are incorporated by reference herein.

As chiral dopant compounds C which are preferably present in the chiral dopant composition (species III modifying agent) the chiral dopant compounds B set forth above may, for example, be used. Accordingly, everything that is set forth above with respect to compounds B applies equally and without exception also to compounds C. Also, it is to be appreciated that a (or the only) chiral dopant compound C that is present in the chiral dopant composition may be identical to a (or the only) chiral dopant compound B that is present in the chiral liquid crystal precursor composition.

The chiral dopant composition will usually comprise the one or more chiral dopant compounds in a total concentration of from about 0.1% to about 30% by weight, e.g., from about 0.1% to about 25%, or from about 0.1% to about 20% by weight, based on the total weight of the composition. Often, the total concentration will be from 3% to 10% by weight, e.g., from 5% to 8% by weight, based on the total weight of the chiral liquid crystal precursor composition.

Additional information relating to species I, II and III second modifying agents may be found in U.S. patent application Ser. Nos. 12/783,068; 12/783,078; 12/783,081 and 12/783,088, all filed May 19, 2010, the entire disclosures of which are expressly incorporated by reference herein.

In particular if the chiral dopant composition is to be applied by the printing techniques set forth above, for example, by ink jet printing, the composition will usually comprise a solvent to adjust its viscosity to a value which is suitable for the employed application (printing) technique. Typical viscosity values for ink-jet printing inks are in the range of from about 4 to about 30 mPa·s at 25° C. Suitable solvents are known to those of skill in the art. Non-limiting examples thereof include low-viscosity, slightly polar and aprotic organic solvents, such as, e.g., methyl ethyl ketone (MEK), acetone, ethyl acetate, ethyl 3-ethoxypropionate, toluene and mixtures of two or more thereof. Others suitable components needed for printing techniques used in the context of the present invention may also be present (resins, salts, etc.) and are known to those of skilled in the art. For example, the chiral dopant composition may comprise one or more conductivity agents such as, e.g., salts which are to impart sufficient conductivity to the chiral dopant composition so as to allow its use in combination with a printer such as, e.g., a continuous ink jet printer. Examples of suitable conductivity agents include those which are set forth above as examples of conductivity agents for use in the chiral liquid crystal precursor composition of the present invention such as, e.g., tetrabutyl ammonium nitrate, tetrabutyl ammonium perchlorate, tetrabutyl ammonium hexafluorophosphate, potassium hexafluorophosphate, potassium thiocyanate, lithium perchlorate and other conductivity agents known in the art.

After the application of the chiral dopant composition to one or more second areas of the chiral liquid crystal precursor composition in the initial chiral liquid crystal state exhibiting the initial set of optical properties (and optionally also to one or more first areas or parts thereof), the one or more second areas are brought to the second modified chiral liquid crystal state having the second modified set of optical properties. To that end at least the one or more second areas onto which the chiral dopant composition has been applied is heated, whereby the solvent contained in the composition, if present, is evaporated and the promotion of the desired second modified chiral liquid crystal state takes place. The temperature used to evaporate the solvent and to promote the formation of the second modified chiral liquid crystal state depends on, e.g., the components of chiral dopant composition and will in many cases range from about 55° C. to about 150° C., e.g., from about 55° C. to about 100° C., preferably from about 60° C. to about 100° C. Examples of suitable heating sources include conventional heating means and in particular, radiation sources such as, e.g., an IR lamp.

In the marking according to the present invention the deposition of the one or more second modifying agents (species I modifying agent and/or species II modifying agent and/or species III modifying agent) may be performed onto one or more second areas of the chiral liquid crystal precursor composition in the initial chiral liquid crystal state (which second areas may include or exclusively be the one or more first areas or parts thereof in which the composition is in the first modified chiral liquid crystal state), preferably with a printing technique and in particular, a technique selected from continuous ink-jet printing, drop-on-demand ink jet printing, valve jet printing and spray coating. The advantage, in particular compared to the prior art using lasers or extracting agents on polymerized or partially polymerized liquid crystals is the speed and ease of the formation of the marking, which is generated in almost real time. Another advantage of using the above printing techniques is the precision and the stability of the marking created inside the chiral liquid crystal state. Another advantage of using this printing technique is the nearly unlimited possibilities of marking which can be created and varied in almost real time. In a preferred embodiment ink-jet techniques are used for applying the modifying composition. The industrial ink-jet printers, commonly used for numbering and coding and marking applications on conditioning lines and printing presses, are particularly suitable. Preferred ink-jet printers are single nozzle continuous ink jet printers (also called raster or multi level deflected printers) and drop-on-demand ink jet printers, in particular valve-jet printers.

In order to enhance the resolution of the applied marking it will often be advantageous if immediately after the application of a second modifying agent to one or more second areas of the applied chiral liquid crystal precursor composition a stream of air is passed over the surface of the chiral liquid crystal precursor composition, preferably (substantially) parallel thereto. The stream of air can be generated by any means, e.g., with an industrial air dryer. The stream of air will preferably not be intense and/or of high speed. The temperature of the air will usually be ambient (e.g., about 20° C.) but may also be somewhat lower or higher, e.g., up to about 60° C., up to about 40° C., or up to about 30° C. The phrase "immediately after the application of a second modifying agent" is intended to mean without delay, e.g., within a period of not more than about 10 seconds, for example, not more than about 5 seconds, not more than about 3 seconds, not more than about 2 seconds, or not more than about 1 second following the completion of the application of the second modifying agent.

The area of the applied chiral liquid crystal precursor composition onto which each of the first and second (and any additional) modifying agents is applied will usually be from about 0.1% to about 99.9% of the total area of the applied chiral liquid crystal precursor composition. The area will often be at least about 1%, e.g., at least about 5% or at least about 10% and not higher than about 99%, e.g., not higher than about 95% or not higher than about 90% of the total area of the applied chiral liquid crystal precursor composition.

As in the case of the first modifying agent it is, of course, possible to use more than one second modifying agent (e.g., two, three or more different second modifying agents) and to apply them simultaneously and/or successively onto the applied chiral liquid crystal precursor composition (e.g., in different areas of the applied chiral liquid crystal precursor composition). Merely by way of example, the different second modifying agents may comprise two different species III modifying agents, or they may comprise a species I modifying agent, a species II modifying agent and a species III modifying agent, or they may comprise two different species II modifying agents and a species I modifying agent, etc. It also is possible, for example, to apply a first second modifying agent and to thereafter apply a different second modifying agent in at least a part of the area(s) in which the initially applied first second modifying agent has been applied (and, optionally, also in one or more areas where the first second modifying agent has not been applied). In this regard, it further is to be appreciated that especially in cases where both a species I modifying agent and a species II modifying agent and/or a species III modifying agent are employed, it may be desirable for reasons of convenience to carry out the heating that is needed for a species II or species III modifying agent also in the case of the species I modifying agent. In other words, while not necessary, it is possible to (again) heat the chiral liquid crystal precursor composition after the application of the species I modifying agent (and optionally, the passing of air over the surface of the chiral liquid crystal precursor composition) to further modify the chiral liquid crystal state and/or to remove any residual solvent that was present in the species I modifying agent. However, in most cases an (additional) heating operation after the application of the species I modifying agent will not be necessary. If employed, the temperature used for this (optional) heating operation will in many cases range from about 55° C. to about 150° C., e.g., from about 55° C. to about 100° C., or from about 60° C. to about 100° C. Examples of suitable heating sources include conventional heating means and in particular, radiation sources such as, e.g., an IR lamp.

Especially when two or more different second modifying agents are to be employed the printing process can be carried out with a multi-head system (with, e.g., two, three, four, five or more heads) wherein each head contains a different modifying agent. An advantage of such a configuration is that during the printing process one can obtain a sequentially different modification of the initial chiral liquid crystal state and therefore a great number of unique markings. With the multi-head system one can also obtain different zones with different optical properties on the same marking, which constitute in itself a unique marking (especially when it is in the form of a data matrix). Examples of such data matrices with various multicolor data matrices are described in, e.g., WO 2008/127950 and WO 01/24106, the entire disclosures of which are incorporated by reference herein.

In order to strengthen the security of the marking according to the present invention the second modifying agent may further comprise one or more pigments and/or dyes which absorb in the visible or invisible region of the electromagnetic spectrum and/or may further comprise one or more pigments and/or dyes which are luminescent. Non-limiting examples of suitable pigments and/or dyes which absorb in the visible or invisible region of the electromagnetic spectrum include phthalocyanine derivatives. Non-limiting examples of suitable luminescent pigments and/or dyes include lanthanide derivatives. The presence of pigment(s) and/or dye(s) will enhance and reinforce the security of the marking against counterfeiting. Of course, in addition to the components discussed above the modifying composition for use in the present invention may comprise any other components/substances which do not adversely affect the required properties of the modifying composition to any significant extent.

The marking according to the present invention eventually is obtained by curing and/or polymerizing the composition that has been locally modified (in one or more areas) by the action of the first and second modifying agents (and any additional modifying agents, if employed). The fixing or hardening is preferably performed by irradiation with UV-light, which induces polymerization of the polymerizable groups present in the chiral liquid crystal precursor composition (and optionally in the modifying agent(s)).

Accordingly, an entire process for making a marking of the present invention may comprise the following steps (using one first modifying agent and one second modifying agent):
providing a functionalized substrate which comprises a first modifying agent onto the surface of a substrate or item;
Curing and/or drying the applied modifying resin at least partially, for instance fully;
Applying a (salt-containing) chiral liquid crystal precursor composition onto a portion of the substrate that has the modifying resin thereon so that the chiral liquid crystal precursor composition covers the modifying resin in the one or more first areas of the applied composition;
Heating the applied chiral liquid crystal precursor composition to bring it to the chiral liquid crystal state;
Applying a second modifying agent to the one or more second areas of the chiral liquid crystal precursor composition in the chiral liquid crystal state;
Heating the chiral liquid crystal precursor composition onto which the second modifying agent has been applied (for species II and species III modifying agents);
Curing/polymerizing the liquid crystal precursor composition in a chiral liquid crystal polymer state (and optionally, completing the curing and/or drying of the modifying resin) to obtain the marking according to the present invention.

It is to be noted here that no substantial curing/polymerizing of the chiral liquid crystal precursor composition takes place until the end of the described production process.

By functionalized substrate it is meant a substrate as described above which comprise the first modifying agent according to the present invention (e.g the at least one resin as described above cured and/or dried, see FIG. 1)

The following examples are intended to illustrate the invention without restricting it.

EXAMPLE 1

A PET substrate (thickness 50 μm) is functionalized with a UV curable resin used as a first modifying agent. This first modifying agent is deposited on the substrate using a flexographic printing process in one or more first areas and is cured with a UV dryer. The functionalized substrate is placed on a conveyor belt and is passed under a first continuous inkjet nozzle (Head 1; CIJ printer from Domino, UK; jet pressure 2500-3000 mbar; nozzle width 75 μm) which contains a chiral liquid crystal precursor composition (see Composition 1 below). Head 1 applies a layer of Composition 1 (thickness 5 μm) onto the functionalized substrate. Thereafter the thus coated substrate is heated with an IR lamp (Strip IR, PCS Inc. & Research Inc., USA; lamp length 15 cm; 500 W max) for about 1 second to thereby promote the chiral liquid crystal state of Composition 1. At this stage the chiral liquid crystal layer which is on top of the functionalized substrate comprises one or more first areas exhibiting a first modified set of optical properties (located in the areas where the resin has been deposited) that is different from the initial set of optical properties obtained in the areas where Composition 1 is directly applied to the substrate, i.e., in the absence of the first modifying agent. In a subsequent step the substrate having the chiral liquid crystal layer thereon is passed under a second continuous inkjet nozzle (Head 2) which applies a second modifying agent (see Composition 2 below) on top of the substrate in one or more areas where the first modifying agent was not applied. The resulting product is subjected to a stream of ambient air. It is observed that in the area(s) where the second modifying agent has been deposited a second modified set of optical properties appears. This second set is different from the initial set of optical properties and from the first set of optical properties. The substrate with the three different areas (initial, first and second areas) is then subject to curing with a UV dryer (see above) to fix the liquid crystal polymer state and to obtain a marking according to the present invention that exhibits at least three different sets of optical properties.

| Composition 1: | |
| --- | --- |
| Component | % |
| Cholesteric compound B | 6.80 |
| Nematic compound A1 | 18.00 |
| Nematic compound A2 | 18.00 |
| TBAClO$_4$ | 0.60 |
| LiClO$_4$ | 0.40 |
| Irgacure 907 | 1.25 |
| DETX | 0.70 |
| Silane | 1.00 |
| Acetone | 53.25 |

TBAClO$_4$ = tert-Butylammonium perchlorate
DETX = 2,4-Diethylthioxanthone

| Composition 2: | |
| --- | --- |
| Component | % |
| Chlorinated polyolefin | 5.00 |
| Polyvinyl butyral | 5.00 |
| KPF$_6$ | 0.60 |
| Fluorescent marker | 4.00 |
| MIBK | 10.00 |
| MEK | 75.40 |

MIBK = Methyl isobutyl ketone
MEK = Methyl ethyl ketone

EXAMPLE 2

Example 1 is repeated but replacing Composition 2 by Composition 3 set forth below. In contrast to Example 1 after application of Composition 3 the resultant product is subjected not only to a stream of ambient air but is also heated with an IR lamp for about 1 second to promote the chiral liquid crystal state of Composition 3.

The procedures set forth in Examples 1 and 2 are illustrated in FIG. 1.

| Composition 3: | |
| --- | --- |
| Component | % |
| Cholesteric compound B | 7.50 |
| Nematic compound A1 | 17.65 |
| Nematic compound A2 | 17.65 |
| TBAClO$_4$ | 0.60 |
| LiClO$_4$ | 0.40 |
| Irgacure 907 | 1.25 |
| DETX | 0.70 |
| Silane | 1.00 |
| Acetone | 53.25 |

EXAMPLE 3 and 4

Figure 2:
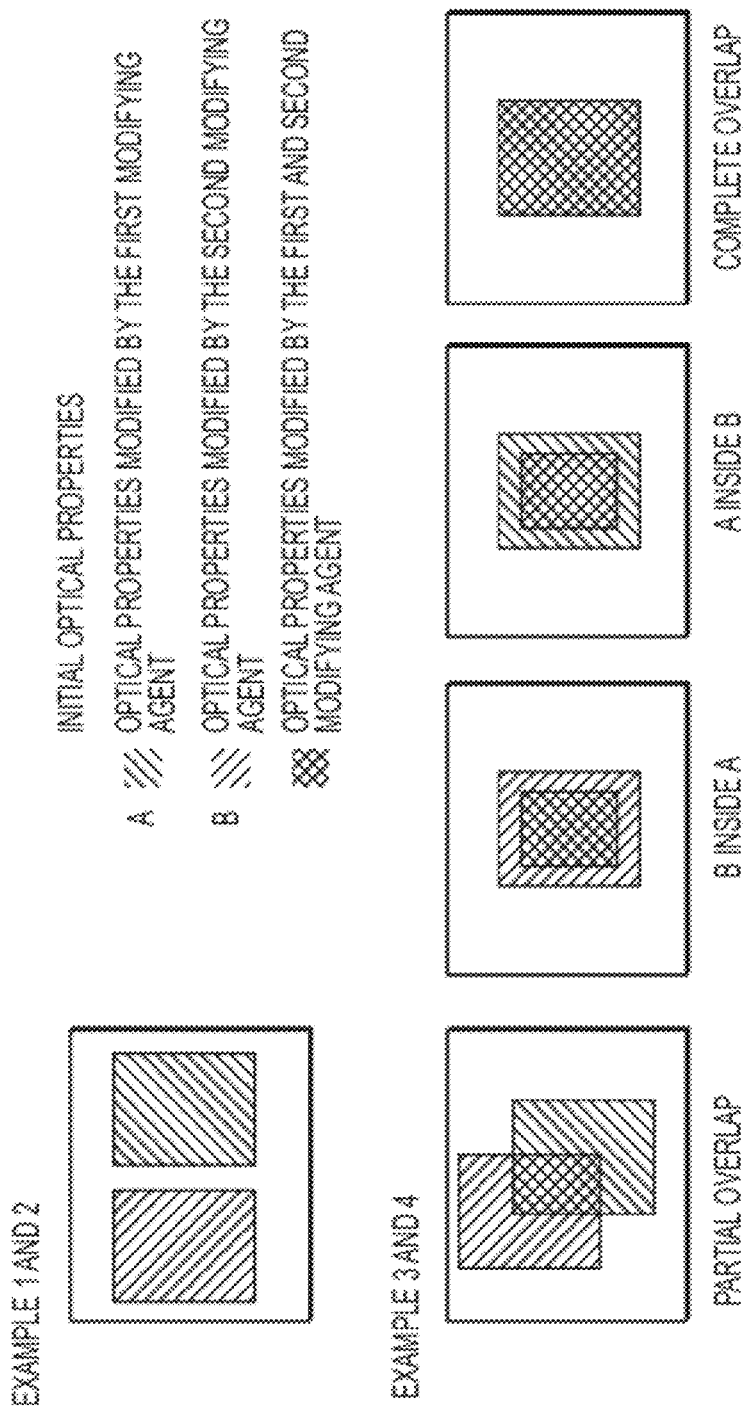
FIGS. 2 and 3 shows different patterns that are obtainable by arranging first and second areas on the substrate in different ways.
Figure 3:
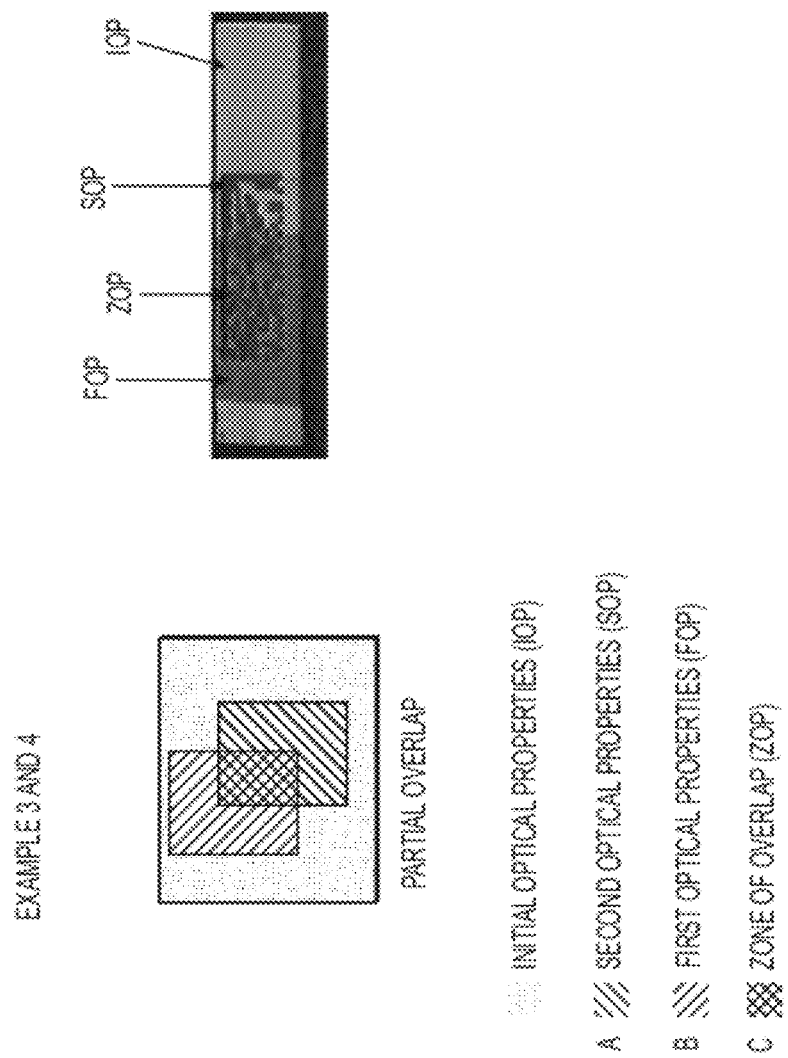

Examples 1 and 2 are repeated with the exception that Head 2 applies Composition 2 (Example 1) or Composition 3 (Example 2) in one or more second areas which completely or partially overlap or are located within one or more first areas, to thereby create one or more areas which exhibit a (third) modified set of optical properties that is different from the initial, first and second sets of modified properties. Corresponding patterns (including those obtained according to Examples 1 and 2) are illustrated in FIG. 2. This allows, for example, to create a data matrix which is the sum of dots of different optical properties (e.g., different colors) within a limited area, to thereby enhance the level of security (if, for example, the second modifying agent comprises a fluorescent dye). In FIG. 3, shows a marking in the form of a data matrix code generated as in Example as follow:

the first modifying agent is in form of a rectangle, wherein it is superposed the liquid crystal polymer layer which has been further modified by the second modifying agent in the form of a data matrix.

It is noted that the foregoing examples have been provided merely for the purpose of explanation and are in no way to be construed as limiting of the present invention. While the present invention has been described with reference to an exemplary embodiment, it is understood that the words which have been used herein are words of description and illustration, rather than words of limitation. Changes may be made, within the purview of the appended claims, as presently stated and as amended, without departing from the scope and spirit of the present invention in its aspects. Although the present invention has been described herein with reference to particular means, materials and embodiments, the present invention is not intended to be limited to the particulars disclosed herein; rather, the present invention extends to all functionally equivalent structures, methods and uses, such as are within the scope of the appended claims.

What is claimed is:

1. A marking on an item or substrate, wherein the marking comprises a layer or pattern of a chiral liquid crystal polymer composition that exhibits an initial set of optical properties and is made by curing a chiral liquid crystal precursor composition in a chiral liquid crystal state and wherein the layer or pattern comprises
   (1) one or more first areas exhibiting a first modified set of optical properties that is different from the initial set of optical properties and is obtainable by contacting the chiral liquid crystal precursor composition in the one or more first areas with a first modifying agent;
   (2) one or more second areas exhibiting a second modified set of optical properties that is different from the initial set of optical properties and different from the first modified set of optical properties and is obtainable by contacting the chiral liquid crystal precursor composition in the one or more second areas with a second modifying agent that is of a different type than the first modifying agent.

2. The marking of claim 1, wherein at least one first area is partially or completely overlapped by a second area and/or at least one second area is partially or completely overlapped by a first area.

3. The marking of claim 1, wherein at least one first area is not overlapped by any second area and/or at least one second area is not overlapped by any first area.

4. The marking of claim 1, wherein the initial, first and second modified sets of optical properties differ with respect to at least one property of light that is reflected by the chiral liquid crystal polymer composition.

5. The marking of claim 4, wherein the at least one property is selected from a spectrum, a polarization, and $\lambda_{max}$ of the reflected light.

6. The marking of claim 1, wherein the initial, first and second sets of optical properties comprise at least one property that is indicative of an optically anisotropic state of the chiral liquid crystal polymer composition and/or is indicative of a conversion of an optically anisotropic state to an optically isotropic state.

7. The marking of claim 1, wherein the chiral liquid crystal precursor composition comprises (i) one or more nematic compounds A, (ii) one or more chiral dopant compounds B that are capable of giving rise to a cholesteric state of the chiral liquid crystal precursor composition, and (iii) at least one salt that changes a maximum wavelength of a selective reflection band ($\lambda_{max}$) exhibited by the polymer composition compared to a maximum wavelength of a selective reflection band ($\lambda_{max}$) exhibited by a polymer composition that does not contain the at least one salt.

8. The marking of claim 7, wherein the one or more nematic compounds A as well as the one or more chiral dopant compounds B comprise at least one compound that comprises at least one polymerizable group.

9. The marking of claim 8, wherein the at least one polymerizable group comprises an unsaturated carbon-carbon bond.

10. The marking of claim 8, wherein the at least one polymerizable group comprises a group of formula $H_2C\!=\!CH\!-\!C(O)\!-\!$.

11. The marking of claim 7, wherein all of the one or more nematic compounds A and all of the one or more chiral dopant compounds B comprise at least one polymerizable group.

12. The marking of claim 7, wherein the chiral liquid crystal precursor composition comprises at least one chiral dopant compound B of formula (I):

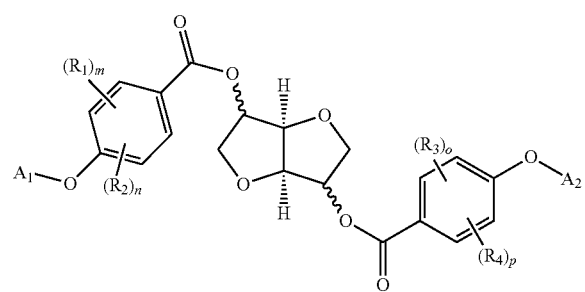

(I)

wherein:

$R_1$, $R_2$, $R_3$, $R_4$, $R_5$, $R_6$, $R_7$ and $R_8$ each independently denote $C_1$-$C_6$ alkyl and $C_1$-$C_6$ alkoxy;

$A_1$ and $A_2$ each independently denote a group of formula (i) to (iii):

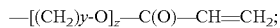 (i)

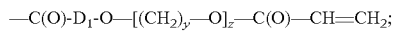 (ii)

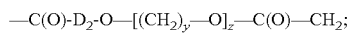 (iii)

$D_1$ denotes a group of formula

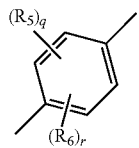

$D_2$ denotes a group of formula

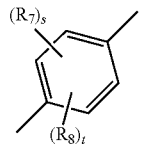

m, n, o, p, q, r, s, and t each independently denote 0, 1, or 2;
y denotes 0, 1, 2, 3, 4, 5, or 6;
z equals 0 if y equals 0 and z equals 1 if y equals 1 to 6.

13. The marking of claim 7, wherein the at least one salt is selected from metal salts and ammonium salts.

14. The marking of claim 13, wherein the at least one salt comprises at least one of lithium perchlorate, lithium nitrate, lithium tetrafluoroborate, lithium bromide, lithium chloride, tetrabutylammonium perchlorate, tetrabutylammonium chloride, tetrabutylammonium tetrafluoroborate, tetrabutylammonium bromide, sodium carbonate, sodium chloride, and sodium nitrate.

15. The marking of claim 1, wherein the chiral liquid crystal precursor composition is in an optically anisotropic state and wherein in the one or more first areas the optically anisotropic state is changed to a first modified optically anisotropic state, and/or in the one or more second areas the optically anisotropic state is changed to a second modified optically anisotropic state or converted to an optically isotropic state.

16. The marking of claim 1, wherein the chiral liquid crystal precursor composition is in an initial chiral liquid crystal state and wherein in the one or more first areas the initial chiral liquid crystal state is changed to a first modified chiral liquid crystal state by the first modifying agent, and in the one or more second areas the initial chiral liquid crystal state is changed to a second modified chiral liquid crystal state or is converted to a non-chiral liquid crystal state by the second modifying agent.

17. The marking of claim 1, wherein the first modifying agent is solid or semi-solid and the second modifying agent is fluid.

18. The marking of claim 1, wherein the first modifying agent is virtually unable to penetrate the composition in the uncured state and the second modifying agent at least partially penetrates the composition in the uncured state.

19. The marking of claim 1, wherein the first modifying agent is or comprises a resin made from one or more polymerizable monomers.

20. The marking of claim 19, wherein at least one of the one or more polymerizable monomers comprises at least two unsaturated carbon-carbon bonds.

21. The marking of claim 19, wherein at least one of the one or more polymerizable monomers comprises at least one heteroatom selected from O, N and S.

22. The marking of claim 19, wherein at least one of the one or more polymerizable monomers comprises at least one group of formula $H_2C\!=\!CH\!-\!C(O)\!-\!$ or $H_2C\!=\!C(CH_3)\!-\!C(O)\!-\!$.

23. The marking of claim 19, wherein the resin comprises a radiation-cured resin.

24. The marking of claim 23, wherein the radiation-cured resin comprises a UV-cured resin.

25. The marking of claim 19, wherein the resin comprises a dried aqueous resin.

26. The marking of claim 1, wherein the second modifying agent is fluid and selected from one or more of (a) a modifying composition that comprises at least one compound selected from ketones having from 3 to about 6 carbon atoms, alkyl esters and dialkylamides of carboxylic acids which comprise a total of from 2 to about 6 carbon atoms, dialkyl sulfoxides comprising a total of from 2 to about 4 carbon atoms, and optionally substituted nitrobenzene, (b) a modifying composition that comprises at least one chiral liquid crystal precursor composition, and (c) a modifying composition that comprises at least one chiral dopant composition.

27. The marking of claim 26, wherein the first modifying agent is selected from a solid or semi-solid cured and/or dried resin made from one or more polymerizable monomers, and both the first modifying agent and the second modifying agent change an initial maximum wavelength of a selective reflection band ($\lambda_{max}$) exhibited by the chiral liquid crystal precursor composition in the chiral liquid crystal state.

28. The marking of claim 1, wherein the first modifying agent and the second modifying agent act from opposite sides of the layer or pattern of the chiral liquid crystal precursor composition.

29. The marking of claim 1, wherein the one or more first areas and/or the one or more second areas are in a form of at least one of an image, a picture, a logo, indicia, and a pattern representing a code selected from one or more of a 1-dimensional barcode, a stacked 1-dimensional barcode, a 2-dimensional barcode, a 3-dimensional barcode, a cloud of dots, a network of lines and a data matrix.

30. The marking of claim 1, wherein at least a part of the layer or pattern of the chiral liquid crystal polymer composition is in a form of at least one of an image, a picture, a logo, indicia, and a pattern representing a code selected from one or more of a 1-dimensional barcode, a stacked 1-dimensional barcode, a 2-dimensional barcode, a 3-dimensional barcode, a cloud of dots, a network of lines and a data matrix.

31. The marking of claim 1, wherein the item or substrate is or comprises at least one of a label, packaging, a cartridge, a container or a capsule that contains foodstuffs, nutraceuticals, pharmaceuticals, or beverages, a banknote, a credit card, a stamp, a tax label, anti-tamper seal, a security document, a passport, an identity card, a driver's license, an access card, a transportation ticket, an event ticket, a voucher, an ink-transfer film, a reflective film, an aluminum foil, and a commercial good.

32. A method of providing a marking on an item or substrate, wherein the method comprises:
a) applying onto a surface of an item or substrate which carries a first modifying agent in one or more first areas a curable chiral liquid crystal precursor composition which has an initial chiral liquid crystal state upon heating it in such a way that the composition covers at least a part of the one or more first areas, the first modifying agent being able to modify an initial chiral liquid crystal state of the composition;
b) heating the applied composition to bring the same to a first modified chiral liquid crystal state in the one or more first areas and to the initial chiral liquid crystal state in all other areas, if any, of the applied composition;
c) applying to one or more second areas of the applied composition at least one second modifying agent which is of a different type than the first modifying agent and (1) is able to locally modify the initial and/or first modified chiral liquid crystal states provided by b), or (2) is able to locally modify the initial and/or first chiral liquid crystal states provided by b) upon heating the composition;
d) in the case of (2), heating the composition at least in the one or more second areas; and
e) curing the thus modified chiral liquid crystal precursor composition to produce a chiral liquid crystal polymer marking on the item or substrate.

33. An item or substrate that is obtainable by the method of claim 32.

* * * * *

UNITED STATES PATENT AND TRADEMARK OFFICE
CERTIFICATE OF CORRECTION

PATENT NO. : 8,821,756 B2
APPLICATION NO. : 13/479913
DATED : September 2, 2014
INVENTOR(S) : T. Tiller et al.

It is certified that error appears in the above-identified patent and that said Letters Patent is hereby corrected as shown below:

In the Claims

Column 37, line 55 (claim 12, line 11), "$-C(O)-D_2-O-[(CH_2)_y-O]_z-C(O)-CH_2$" should read -- $-C(O)-D_2-O-[(CH_2)_y-O]_z-C(O)-CH=CH_2$ --.

Signed and Sealed this
Ninth Day of June, 2015

Michelle K. Lee
*Director of the United States Patent and Trademark Office*